US012437613B2

United States Patent
Marks et al.

(10) Patent No.: US 12,437,613 B2
(45) Date of Patent: Oct. 7, 2025

(54) NETWORK-BASED GAMEPLAY INTERACTION SYSTEM

(71) Applicant: Aristocrat Technologies, Inc., Las Vegas, NV (US)

(72) Inventors: Daniel Marks, Decatur, GA (US); Alfred Thomas, Ventura, CA (US); Hua Xu, Marietta, GA (US); Scott Burns, Las Vegas, NV (US); Joseph Masinter, II, Las Vegas, NV (US); Jehoshua Josue, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 82 days.

(21) Appl. No.: 18/427,365

(22) Filed: Jan. 30, 2024

(65) Prior Publication Data

US 2024/0169803 A1 May 23, 2024

Related U.S. Application Data

(63) Continuation of application No. 17/834,765, filed on Jun. 7, 2022, now Pat. No. 11,928,936.
(Continued)

(51) Int. Cl.
*G07F 17/32* (2006.01)
*G06F 7/58* (2006.01)

(52) U.S. Cl.
CPC .......... *G07F 17/3276* (2013.01); *G06F 7/588* (2013.01); *G07F 17/3209* (2013.01);
(Continued)

(58) Field of Classification Search
None
See application file for complete search history.

(56) References Cited

U.S. PATENT DOCUMENTS

2011/0269549 A1* 11/2011 Kelly .................. G07F 17/3244
463/42
2016/0307395 A1 10/2016 Frenkel
(Continued)

OTHER PUBLICATIONS

Playtech Live Casino—Bringing Entertainment Home, downloaded from internet on Nov. 28, 2022, 5 pages. www.icontact-archive.com/archive?c=396287&f=34869&s=68114&m=1843205&t=ea449d8f6c14f9bd45c65ba095b8e3920f03621b52db48f68f84ed864a77e8ce.
(Continued)

*Primary Examiner* — Ronald Laneau
(74) *Attorney, Agent, or Firm* — Armstrong Teasdale LLP

(57) ABSTRACT

An electronic gaming system is described. The electronic gaming system includes a server computing device configured to receive an input from a first user computing device including a request to initiate an electronic game and assign a plurality of user devices to the electronic game. The server is further configured to identify a second player account as an initial play player account, wherein the initial play player account is designated to initiate a first play of the electronic game. The server is further configured to transmit content to a second user computing device that causes a gameplay user interface at the second user computing device to include a first display area including video images from a video stream from the second user computing device and a second display area including video images received by the server from a video stream received from the first user computing device.

20 Claims, 16 Drawing Sheets

Related U.S. Application Data

(60) Provisional application No. 63/349,541, filed on Jun. 6, 2022, provisional application No. 63/208,148, filed on Jun. 8, 2021.

(52) U.S. Cl.
CPC ...... *G07F 17/3211* (2013.01); *G07F 17/3225* (2013.01); *G07F 17/3267* (2013.01)

(56) References Cited

U.S. PATENT DOCUMENTS

| | | |
|---|---|---|
| 2017/0087464 A1 | 3/2017 | Perry |
| 2020/0090463 A1 | 3/2020 | Mohrhardt |
| 2020/0226883 A1* | 7/2020 | Gerchak ............. G07F 17/3288 |
| 2021/0158653 A1 | 5/2021 | Hartstein |
| 2022/0161140 A1 | 5/2022 | Benedetto |
| 2024/0412720 A1* | 12/2024 | Vasylyev ................ G10L 15/22 |

OTHER PUBLICATIONS

Office Action (Notice of Allowance and Fees Due (PTOL-85)) dated Nov. 22, 2023 for U.S. Appl. No. 17/834,765 (pp. 1-9).

* cited by examiner

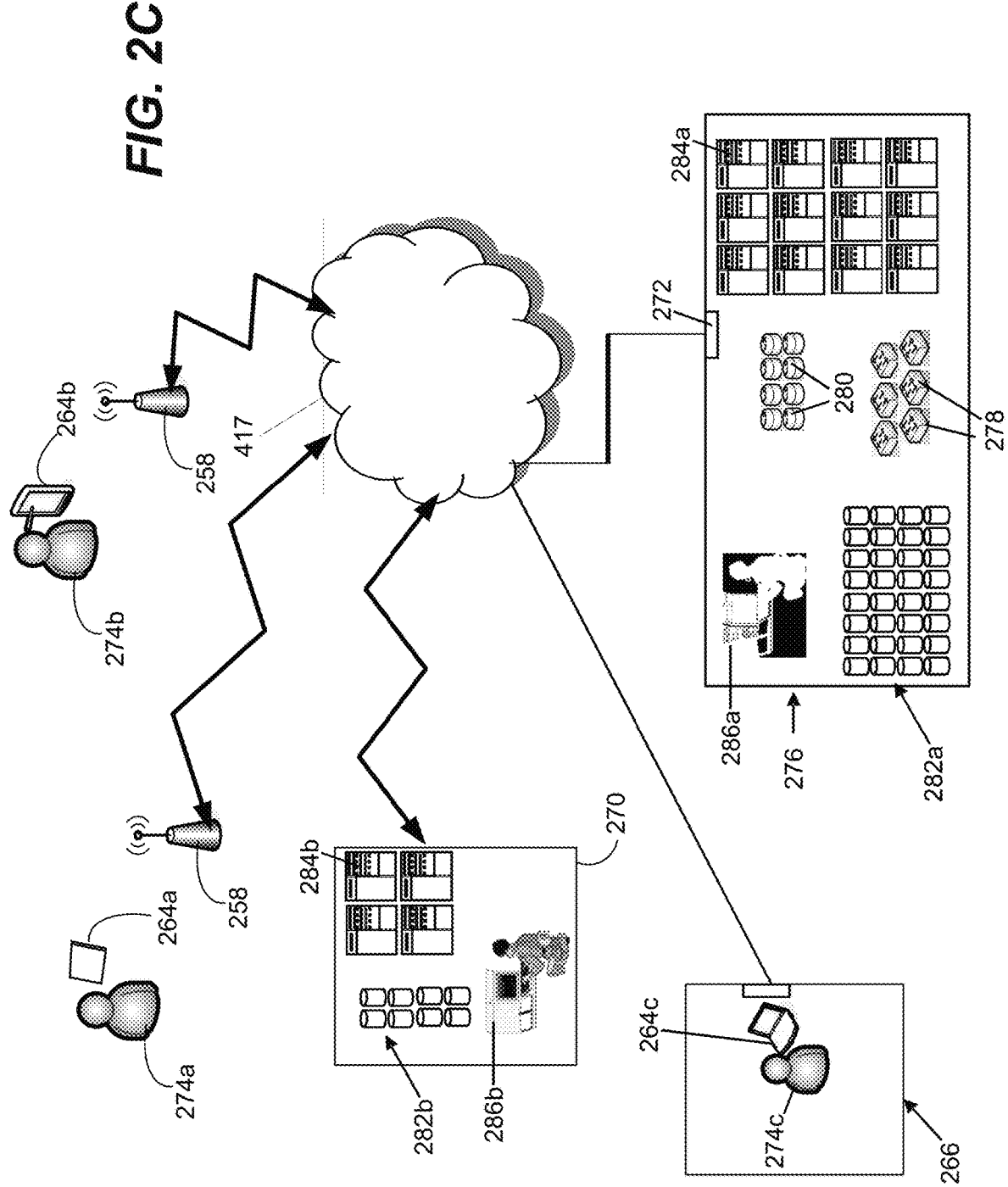

NETWORK-BASED GAMEPLAY INTERACTION SYSTEM

CROSS REFERENCE TO RELATED APPLICATIONS

This application is a continuation of and claims priority to U.S. patent application Ser. No. 17/834,765, filed Jun. 7, 2022, which claims priority to U.S. Provisional Patent Application No. 63/208,148, filed Jun. 8, 2021, and U.S. Provisional Patent Application No. 63/349,541, filed Jun. 6, 2022, each of which is hereby incorporated by reference herein in its entirety.

Further, U.S. patent application Ser. No. 16/011,313, now U.S. Pat. No. 10,810,838, filed Jun. 18, 2018 is hereby incorporated by reference herein in its entirety.

TECHNICAL FIELD

The field of disclosure relates generally to electronic gaming, and more specifically, to a network-based gameplay interaction system.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming system is described. The electronic gaming system includes a server computing device including at least one processor in communication with at least one memory storing instructions. The instructions, when executed by the at least one processor, cause the at least one processor to receive an input from a first user computing device associated with a first player account wherein the input includes a request to initiate an electronic game and assign a plurality of user devices to the electronic game wherein the plurality of user devices are associated with a plurality of player accounts and wherein the plurality of user devices includes the first user computing device and a second user computing device associated with a second player account. The instructions also cause the at least one processor to identify the second player account as an initial play player account wherein the initial play player account includes a player account of the plurality of player accounts designated to initiate a first play of the electronic game. The instructions further cause the at least one processor to transmit content to the second user computing device wherein receipt of the content causes a gameplay user interface at the second user computing device to be updated to include a first display area including video images from a video stream received by the server from the second user computing device, the first display area indicating that the second player account is the initial play player account and a second display area including video images received by the server from a video stream received from the first user computing device wherein the second display area indicates that the first player account is a host for the electronic game.

In another aspect, a non-transitory computer-readable storage medium with instructions store thereon is described. The instructions, in response to execution by at least one processor, cause the at least one processor to receive an input from a first user computing device associated with a first player account wherein the input includes a request to initiate an electronic game and assign a plurality of user devices to the electronic game wherein the plurality of user devices are associated with a plurality of player accounts and wherein the plurality of user devices includes the first user computing device and a second user computing device associated with a second player account. The instructions also cause the at least one processor to identify the second player account as an initial play player account wherein the initial play player account includes a player account of the plurality of player accounts designated to initiate a first play of the electronic game. The instructions further cause the at least one processor to transmit content to the second user computing device wherein receipt of the content causes a gameplay user interface at the second user computing device to be updated to include a first display area including video images from a video stream received from the second user computing device, the first display area indicating that the second player account is the initial play player account and a second display area including video images received from a video stream received from the first user computing device wherein the second display area indicates that the first player account is a host for the electronic game.

In yet another aspect, a method of electronic gaming implemented by at least one processor in communication with at least one memory is described. The method includes receiving an input from a first user computing device associated with a first player account wherein the input includes a request to initiate an electronic game and assigning a plurality of user devices to the electronic game wherein the plurality of user devices are associated with a plurality of player accounts and wherein the plurality of user devices includes the first user computing device and a second user computing device associated with a second player account. The method also includes identifying the second player account as an initial play player account wherein the initial play player account includes a player account of the plurality of player accounts designated to initiate a first play of the electronic game. The method further includes transmitting content to the second user computing device wherein receipt of the content causes a gameplay user interface at the second user computing device to be updated to include a first display area including video images from a video stream received from the second user computing device, the first display area indicating that the second player account is the initial play player account and a second display area including video images received from a video stream received from the first user computing device wherein the second display area indicates that the first player account is a host for the electronic game.

BRIEF DESCRIPTION OF THE DRAWINGS

FIG. 2C is a diagram that shows examples of components of a system for providing online gaming according to some aspects of the present disclosure.

DETAILED DESCRIPTION

Figure 1:
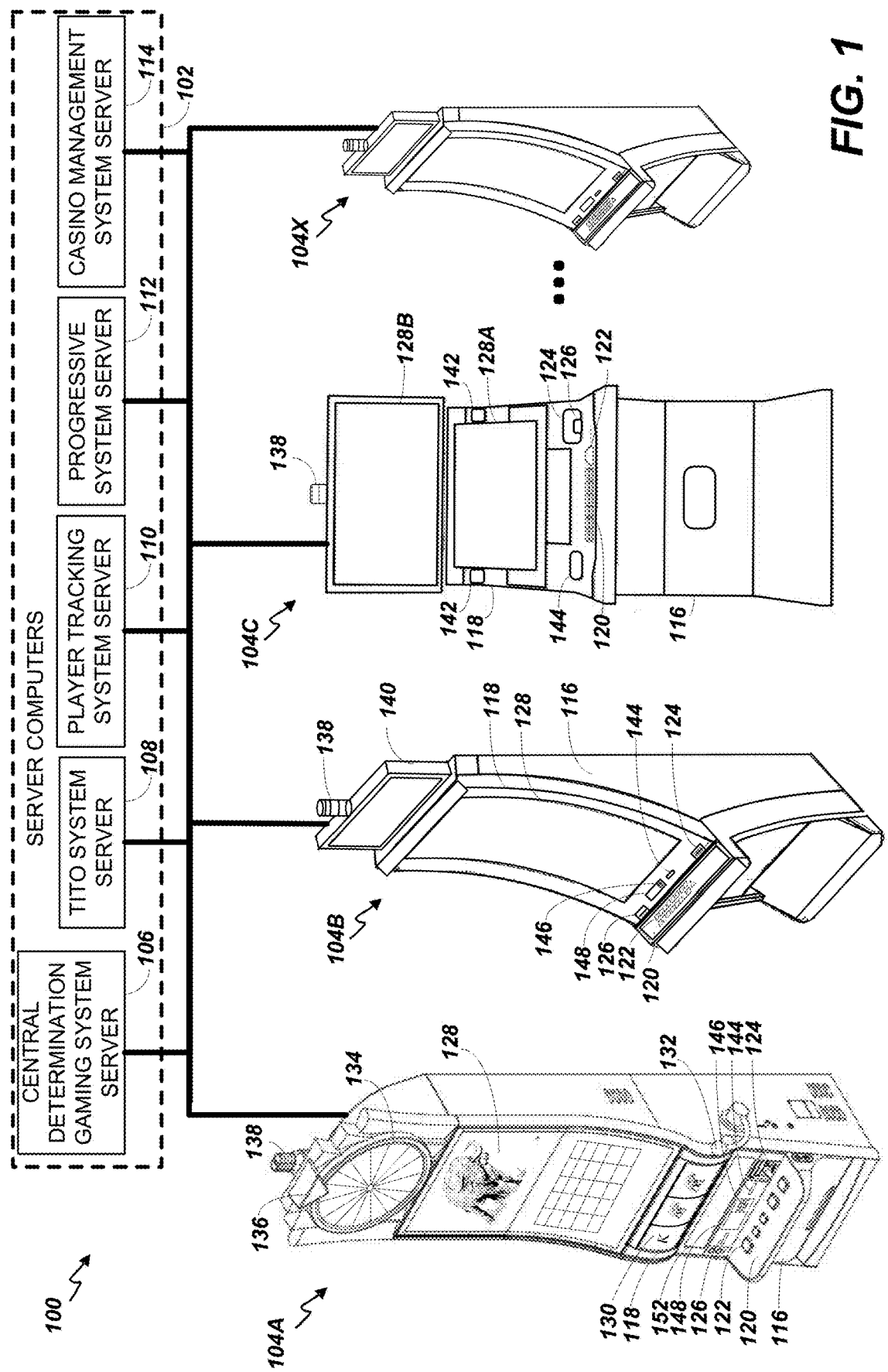
FIG. 1 is an exemplary diagram showing several EGMs networked with various gaming related servers.

This application is directed to systems and methods for network-based gameplay interaction. For example, an online live dealer/host slot game for multiple players may be provided. Each player may place a bet, and all of the bets are pooled. Any wins are distributed amongst the players (e.g., on a pro rata basis with respect to the bets). A dealer interface allows a live dealer to select an incentive to offer to players, the incentive is displayed to the players, and once a threshold is determined to have been met, the incentive is activated. A player designated to select a spin button to initiate a round/play for the players may rotate amongst the players (e.g., the designated player may change upon a control condition being met).

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be taken by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., RAM, cache, hard drive) accessible by the component via an API or other program communication method. Similarly, the variables may be assumed to have default values should a specific value not be described. User interfaces may be provided for an end-user or administrator to edit the variable values in some instances.

People may play games in a variety of manners. For example, a person may use a dedicated gaming console (e.g., a SONY PLAYSTATION), use a computer that has a gaming application installed (or accessed via web browser), or special purpose devices. For example, electronic gaming machines ("EGMs") or gaming devices provide a variety of wagering games such as slot games, video poker games, video blackjack games, roulette games, video bingo games, keno games and other types of games that are frequently offered at casinos and other locations.

In some instances, a person may not want to, or is unable to, physically go to a location to access an EGM. In such instances, a person may want to feel the same experience as if they were at a casino, but do so using a device such as their mobile phone, laptop, etc. Recreating or mimicking the casino experience creates technical challenges that are not present in a physical gaming location. For example, in a physical space a person may be able to look around and see who they are playing with, a dealer, etc. Similarly, in a community-style game, a person may be able to see the bets others are using and know exactly who is talking based on the direction of another's voice. In an online gaming environment, there may be instances where a player becomes unresponsive due to network connectivity issues. Described herein are example systems and methods that recreate many of the aspects of a physical gaming environment wherein each player and dealer may be physically separate while the technical challenges described above are alleviated. Additionally, slot games are traditionally single player devices that do not involve player interaction with other players. However, there is a need to provide a social aspect to these games while allowing the player to play from a remote location.

Certain other technical problems arise when implementing a network-based community-style game as described herein. For example, in some embodiments, multiple video and/or audio feeds (e.g., from different user computing devices) are utilized and need to be re-configured/modified/combined before being transmitted back to the user computing devices. For example, video feeds from different user computing devices may be displayed on a gameplay interface and audio channels from those user computing devices may be combined into a single audio feed. To improve performance of the systems and methods described herein, the video and/or audio feed may all be transmitted to a single device (e.g., a game server, from the respective user computing devices) where those feeds are analyzed and/or combined before being transmitted back to the user computing devices. Accordingly, computer efficiency is increased and bandwidth is saved by utilization of a game server, as described herein, configured to receive and re-configure audio and/or video data for transmission to user computing devices (e.g., as opposed to each user computing device transmitting audio and/or video data directly to each other user computing device).

In the example embodiment, a backend device (e.g., a game server) receives video and/or audio feeds from all user computing devices associated with a game, analyzes and/or re-formats data from the feeds (e.g., configures video feeds to be displayed in certain areas of a gameplay interface), and transmits the analyzed and/or re-formatted data back to the user computing devices. For example, audio feeds from all user computing devices associated with the game may be received. However, audio data transmitted back to each respective user computing device from the game server may only include audio data from all user computing devices associated with the game other than the respective user computing device (e.g., so that a player at a user computing device will not hear an "echo" of audio data from their device being played back to them—they will only receive audio sent to the game server from other user computing devices).

Further, in some embodiments video feeds may be analyzed and configured to be displayed in certain areas of a game interface. For example, the game server may determine which user computing device is associated with a "dealer" and/or host, and overlay a portion of that video feed on a gameplay area of the interface (e.g., including reels, etc.). Certain other video feeds may be controlled to be displayed in other areas of the interface. For instance, a user who is currently in charge of hitting a spin button may have their video be displayed in a "Current Spinner" area interface, while a user who is next in line to hit the spin button may have their video be displayed in a "Next Up" area of the interface. Video data from other user computing devices may or may not be displayed as part of the interface. Accordingly, the interface is monitored/updated so that when the "Current Spinner" changes, video data for the user who was previously "Next Up" is now displayed in the "Current Spinner" area and other video data (e.g., associated with a user who is next in line) is then displayed in the "Next Up" area.

In one example, all video feeds may be analyzed to ensure that video quality and/or connection stability from the user computing devices to a backend device is satisfactory. In some embodiments, if video quality is below a threshold, the backed device may automatically substitute a still image and/or placeholder image for the video feed. In other words, if a video feed from a user computing device is being displayed on all user computing devices (e.g., as part of a game interface) associated with a particular game, and the quality of the video feed drops below a threshold quality, the backend device may automatically substitute a still image (e.g., associated with a user account of the user computing device and/or a generic placeholder) in place of the video feed on the interface (e.g., so other users see a clear copy of the still image as opposed to a blurry/low resolution video feed).

Further, some embodiments provide an overlap or merging of a video feed received from a server, or directly from various client devices, with a locally rendered and displayed game outcome. Locally rendering game outcomes using a central server based RNG outcome saves bandwidth as compared to conventional solutions that stream video of game outcomes. Further, it allows for better synchronization of game outcomes across various client devices as there is less reliance on network bandwidth and latency to receive game outcomes from a server. Additionally, game outcomes can be protected using cryptographic techniques that allow for more efficient protection as compared to those available for video streams of outcomes.

The systems and methods described herein include an online live dealer slot game that may commonly played by multiple players. Each player places their own wager, that is pooled. Any wins are distributed amongst the players (e.g., in proportion to their respective wagers/inputs). Further, the dealer may offer additional incentives to the players for achieving certain goals. The goals can be group play goals (e.g., meeting a threshold wager amount, a certain number of wagers above the threshold amount, etc.) or can be individual goals. The incentives may include additional prizes, group multipliers, and/or individual multipliers, as examples.

An interface is provided that allows the live dealer to select an incentive to offer. The incentive is then displayed for all the players and once the threshold is determined to have been met, the incentive will be activated. In addition, each player may control play of the game based on a selected player control condition (e.g., one player at a time may be able to hit a "spin" button). The player control may be predetermined (e.g., when the group room is created), or may be changed by the live host. Control (e.g., spin control) passes on to a next player after the control condition is met (or not met). For example, a control condition might be spin till you lose (e.g., a game outcome below a threshold amount is provided). Further, options can be set to determine order in which players will spin. In some embodiments, a player can act as a host and house.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL' model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
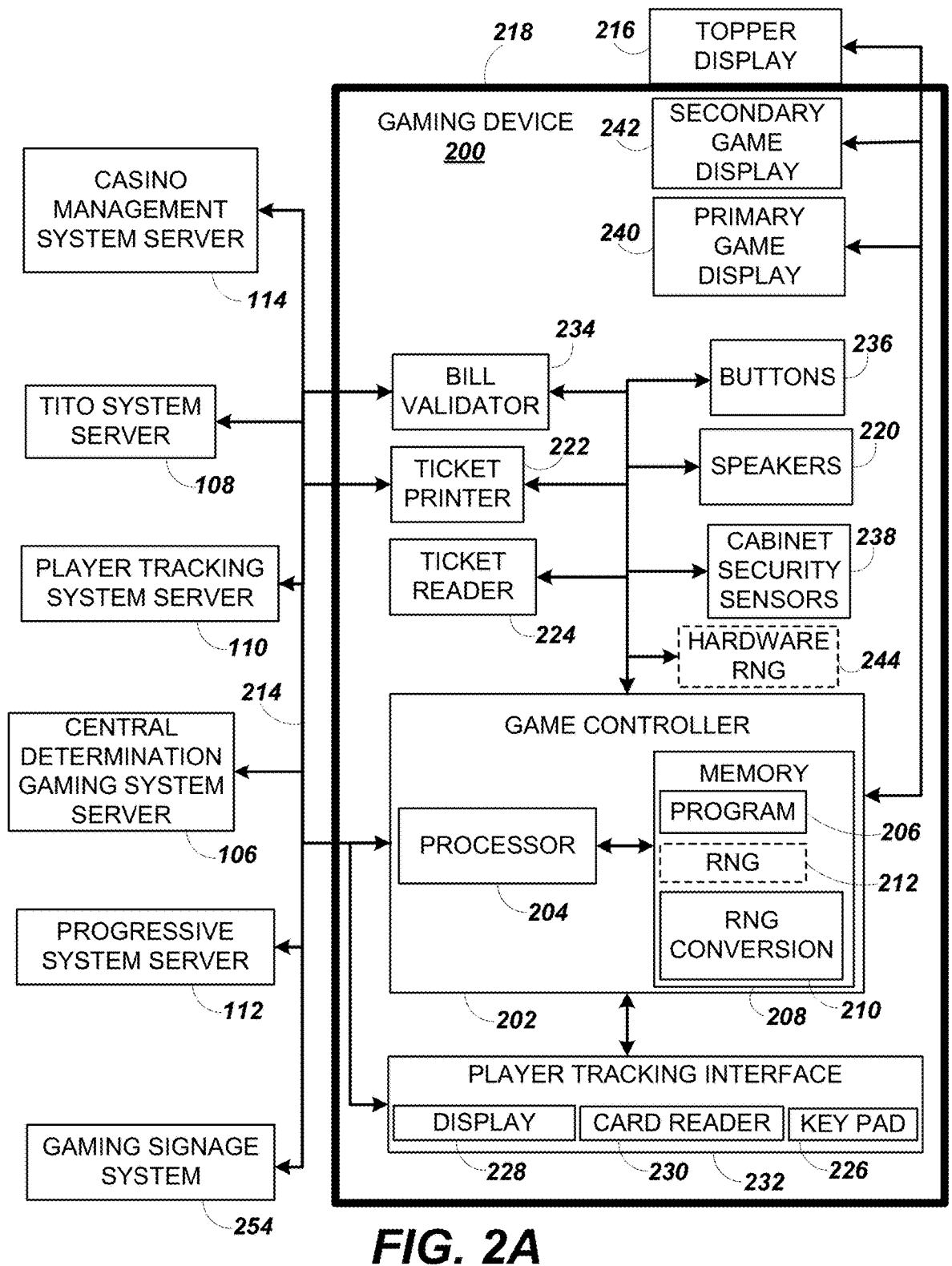
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
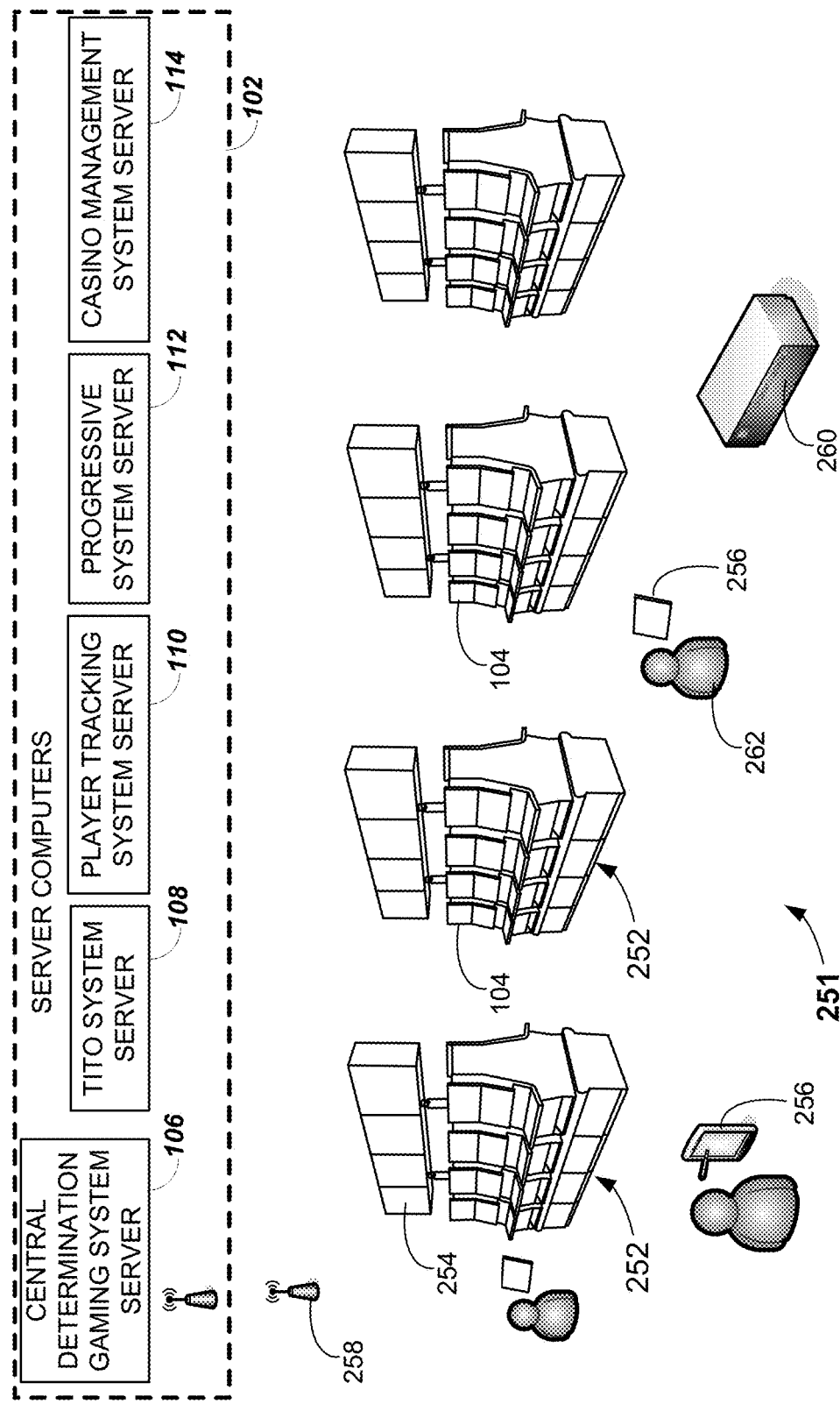
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
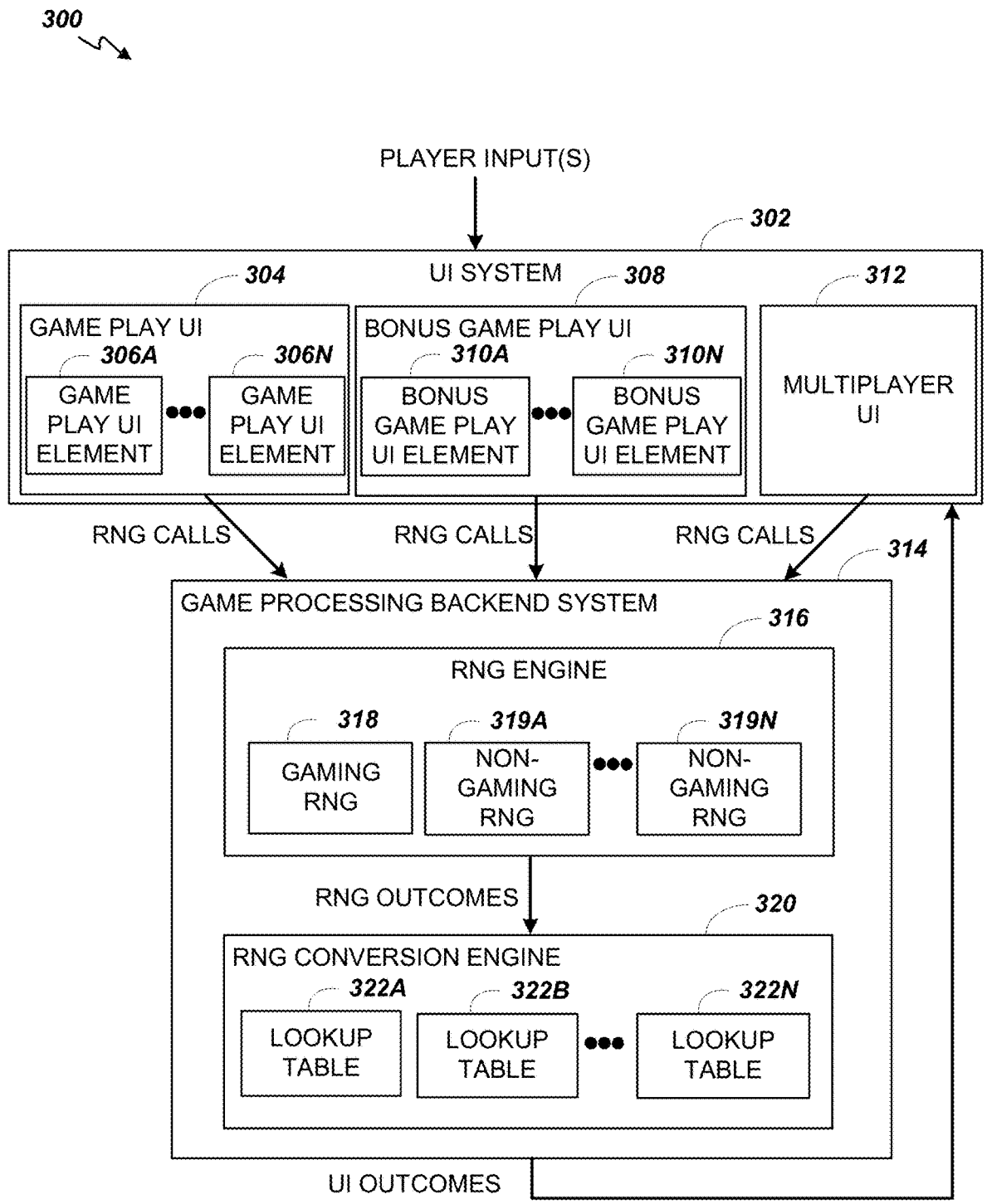
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
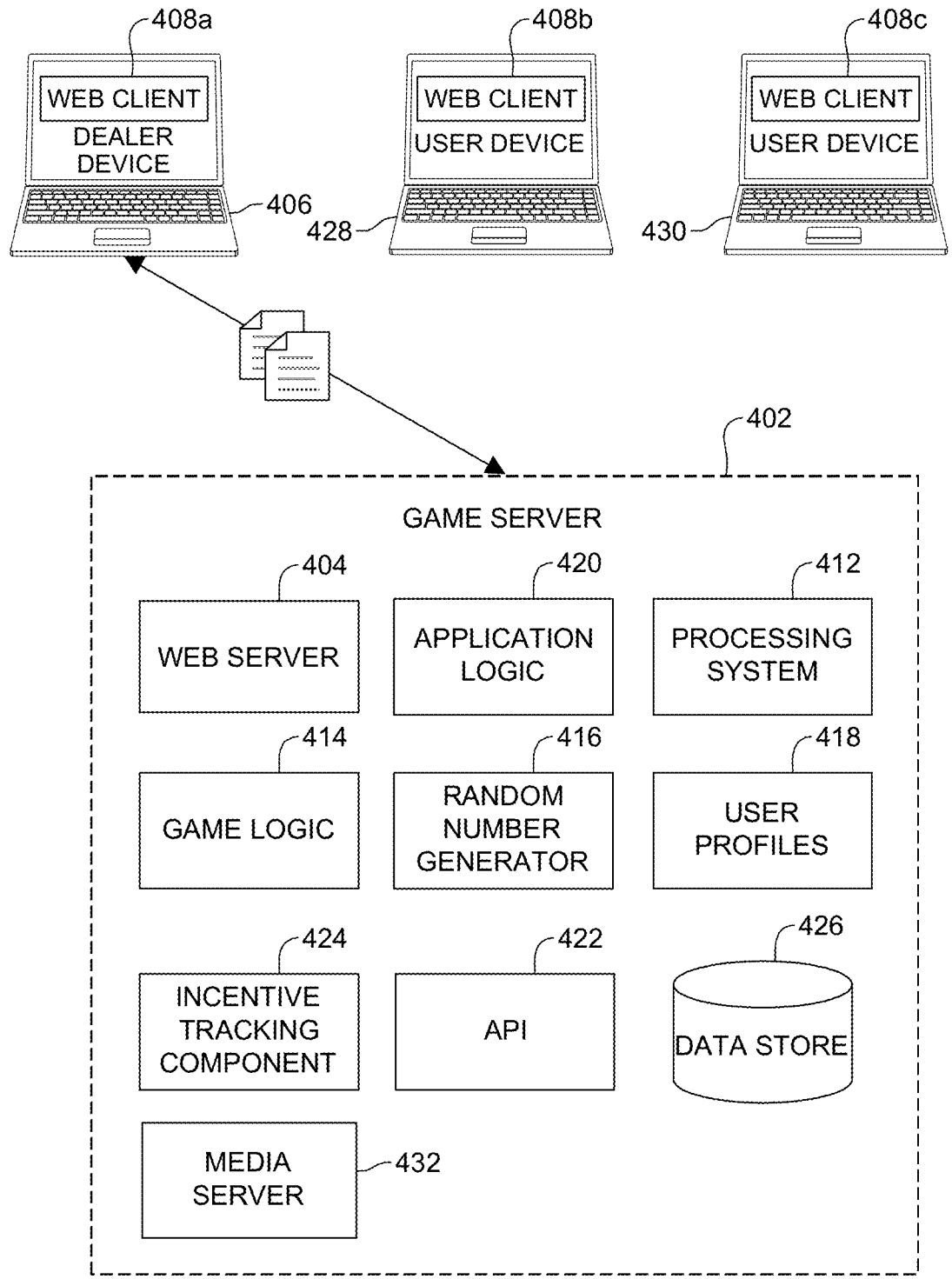
FIG. 4 is an illustration of components of game server communicating with one or more of dealer device and user devices, according to various examples.

FIG. 4 is an illustration of components of game server 402 communicating with one or more of dealer device 406, user device 428, and user device 430 according to various examples. Game server 402, as illustrated, includes web server 404, processing system 412, game logic 414, random number generator 416, user profiles 418, application logic 420, API 422, incentive tracking component 424, data store 426, and media server 432. Dealer device 406 includes web client 408a, user device 428 includes web client 408b, and user device 430 includes web client 408c.

Dealer device 406 (and one or more of a user device 428 and user device 430) may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Dealer device 406 (and one or more of a user device 428 and user device 430) and game server 402 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Dealer device 406 and the user devices may communicate data 410 over the network. Data 410 is illustrated as a single object, but may represent the various bits of electronic data transferred to and between the devices and game server 402. For example, data 410 may be audio data from a voice of one player or an instruction to increase a bet in a game currently being played.

In some examples, the communication may occur using an application programming interface (API) such as API 422. An API provides a method for computing processes to exchange data. A web-based API (e.g., API 422) may permit communications between two or more computing devices such as a client and a server. The API may define a set of HTTP calls according to Representational State Transfer (RESTful) practices. A RESTful API may define various GET, PUT, POST, DELETE methods to create, replace, update, and delete data stored in a Database (e.g., data store 426). For example, an API call may be used to create a virtual room that permits a set of users to play a game.

APIs may also be defined in frameworks provided by an operating system (OS) to access data in an application that an application may not regularly be permitted to access. For example, the OS may define an API call to obtain the current location of a mobile device the OS is installed which may be used to enforce local-based gaming rules or regulations. In another example, an application provider may use an API call to request a be authenticated using a biometric sensor on the mobile device. By segregating any underlying biometric data—e.g., by using a secure element—the risk of unauthorized transmission of the biometric data may be lowered. The APIs of the OS may be also permit access to data captured by audio and video sensors.

Game server 402 is illustrated as set of separate elements (e.g., components, logic, etc.). However, the functionality of individual elements may be performed by a single element. An element may represent computer program code that is executable by processing system 412. The program code may be stored on a storage device (e.g., data store 426) and loaded into a memory of the processing system 412 for execution. Portions of the program code may be executed in a parallel across multiple processing units (e.g., a core of a computer processor, a graphical processing unit, an application specific integrated circuit, etc.) of processing system 412. Execution of the code may be performed on a single device or distributed across multiple devices. In some examples, the program code may be executed on a cloud platform (e.g., MICROSOFT AZURE® and AMAZON EC2®) using shared computing infrastructure.

Game server 402 may include web server 404 to enable data exchanges with dealer device 406 via the web clients 408. Although generally discussed in the context of delivering webpages via the Hypertext Transfer Protocol (HTTP), other network protocols may be utilized by Web server 404 (e.g., File Transfer Protocol, Telnet, Secure Shell, etc.). A user may enter in a uniform resource identifier (URI) into web client 408c (e.g., the INTERNET EXPLORER® web browser by Microsoft Corporation or SAFARI® web browser by Apple Inc.) that corresponds to the logical location (e.g., an Internet Protocol address) of web server 404. In response, web server 404 may transmit a web page that is rendered on a display device of user device 430.

Additionally, web server 404 may enable a user to interact with one or more web applications (e.g., a game) provided in a transmitted web page. A web application may provide user interface (UI) components that are rendered on a display device of dealer device 406. The user may interact (e.g., select, move, enter text into) with the UI components, and, based on the interaction, the web application may update one or more portions of the web page. A web application may be executed in whole, or in part, locally on dealer device 406, user device 428, or user device 430. The web application may populate the UI components with data from external sources or internal sources (e.g., data store 426) in various examples. In various examples, instead of or in addition to a web application, dealer device 406 and user device 428 may interact with game server via API 422 and local applications being executed on dealer device 406 and user device 428.

The web application may be executed according to application logic 420 (e.g., a multi-user video slot machine game as discussed in more detail below). Application logic 420 may use the various elements of game server 402 to implement the web application. For example, application logic 420 may issue API calls to retrieve or store data from data store 426 and transmit it for display on dealer device 406 or user device 428. Similarly, data entered by a user into a UI component may be transmitted using API 422 back to web server 404. Application logic 420 may use other elements (e.g., game logic 414, random number generator 416, user profiles 418, incentive tracking component 424 etc.) of game server 402 to perform functionality associated with the web application as described further herein.

Data store 426 may store data that is used by game server 402. Data store 426 is depicted as singular element, but may in actuality be multiple data stores. The specific storage layout and model used by data store 426 may take a number of forms—indeed, a data store 426 may utilize multiple models. Data store 426 may be, but is not limited to, a relational database (e.g., SQL), non-relational database (NoSQL) a flat file database, object model, document details model, graph database, shared ledger (e.g., blockchain), or a file system hierarchy. Data store 426 may store data on one or more storage devices (e.g., a hard disk, random access memory (RAM), etc.). The storage devices may be in standalone arrays, part of one or more servers, and may be located in one or more geographic areas.

As mentioned previously, one possible use of game server 402 is to play a community-based game. More specifically, an example may be an online live dealer slot-style game. An overview of such a game is described in the context of game logic 414, random number generator 416, user profiles 418, incentive tracking component 424, and data store 426; however, a more thorough description is provided in the context of the subsequent figures.

Within the context of the slot game there may be a number of users with different roles. For example, there may be a user who is a player, a user who is a dealer, or a user who is a host. The host may be the person that is running the room (e.g., created the room, sets certain preferences, etc.). A dealer may control when and what incentives are available to the players, in various examples. In many instances the dealer and host are the same. In many instances a player may also function as a host. In the context of a physical environment, a dealer may be analogous to a dealer of a card game (e.g., someone who moves the game along but may or may not be playing). Throughout this disclosure the term "user" may be used to refer to any of these roles. In some examples, some roles may be implemented as artificial intelligence. For example, a dealer may be a bot in some instances.

The general flow of the of gameplay includes a group of users collectively playing an online slot game in which a live dealer/host may present group incentives. For example, a first player may join with two other players and a dealer/host in a "room." A room may be considered an instance of gameplay between the players. Data store 426 may store data related to rooms, such as whether it is a public room or a private room, the host of the room, which game or games are allowed for that room, the bet amounts, such as minimum and maximum, the incentives active in the room, etc. In instances in which the room is private, data store 426 may include a list of users that have been invited to the room (e.g., or a room password required for entry, etc.). Thus, game server 402 may manage numerous rooms each with their own set of users. Each player may take turns as the spinner of the displayed reels (e.g., according to predetermined rules and/or rules set by the host). Notably, each player in the room may bet on a particular spin regardless of which player is hitting the spin button. The bets are pooled for each spin and the winnings are distributed pro-rata based on the individual betting amounts of each player. Additionally, the room may display group incentives that may be obtained by meeting certain criteria (e.g., total group bet above a threshold, certain number of wagers above a threshold, etc.). In some examples there may be individual incentives (e.g., specific to each player). The group or individual incentives may be additional prizes, group multipliers, or individual multipliers, according to various examples.

Game logic 414 may include the gameplay rules for the game. The gameplay rules may store the conditional logic regarding what happens when a user takes an action in a game (e.g., a button press). For example, if a bet has been made by a player, game logic 414 may dictate that the amount of the bet is added to the group bet and that the user interfaces of each of the active players/player devices is updated to reflect the group bet amount. In some instances, game logic 414 may call other components of game server 402 to implement a user action. For example, once a player activates a spin control user interface element, game logic 414 may call random number generator 416 to determine an outcome of the spin and update the user interfaces accordingly. In various instances, game logic 414 may store gameplay rules for multiple games.

User profiles 418 may store the preferences of the users. The preferences may include, but are not limited to, user interface preferences (e.g., layout, text size, etc.), a friend list, audio/video preferences (e.g., which devices to use for audio and video), preferred dealers, preferred rooms, etc. User profiles 418 may also store authentication credentials that a user uses to log in to game server 402. Each user may also be assigned/create a unique ID that is stored in user profiles 418. User profiles 418 may track a current credit state of a user, an avatar, and any badges a player has won (e.g., for tournaments, playing streaks, wins above a certain amount, etc.), as examples.

In various examples, a preference user interface (via web server 404) may be presented to a user on their respective computing device (e.g., user device 428). The preference user interface may include options to edit the user's preferences. For example, there may be a search user interface element configured to find other users (e.g., by name, e-mail address, unique ID, etc.) and add them to the user's friend list.

Incentive tracking component 424 may include the logic for determining when a room is eligible for an incentive and if the winning conditions for an incentive have been met. In various examples, incentives are dynamically generated during gameplay. In other examples, incentives may be generated and stored before gameplay (e.g., by a dealer, game administrator, etc.). Incentives may be stored as a data structure that includes one more of the following: a type; a winning condition; a reward; and a progression. The type may an individual or group incentive, in various examples. An individual incentive may be one in which the reward flows to a single individual—in contrast to a group incentive in which the reward flows to the group.

A winning condition may define the metrics that need to be met in order for a reward to be achieved. Winning conditions may include a number of bets, a total amount (individually or group) of a bet, number of winning spins in a row, etc. Depending on the winning conditions, game logic 414 checks the conditions once bets have been placed, after the results of a spin or over a number of spins, etc. Once an incentive/condition has been satisfied/met, the award for the incentive may be given to the player(s). In some examples, once a reward condition is met, the reward is activated, but may not be provided immediately. For example, a reward may be two extra free spins after a free spin is triggered. Therefore, the progression may be used to store a trigger condition (e.g., a free spin) relating to when to provide the incentive (e.g., two extra free spins) separately from a trigger condition that determines the incentive has been satisfied/met in the first place.

Some incentives have the capability to be progressive. For example, there may be an incentive for a group 1,000 credit (or points, dollars, etc.) betting amount. If a group of players meets the 1,000 credit amount, the award for the incentive may be given to the player(s). If the incentive is configured as progressive, it may automatically be updated to a new threshold (e.g., 2,000 credits). In other examples, a progressive incentive may unlock a new type of incentive. For example, once the 1,000 credit threshold has been passed, a new incentive location may be unlocked in room (discussed further below in the context of FIG. 5 such as game incentive 512b).

In various examples, game server 402 may include media server 432. In various examples, media server 432 may be separate from game server 402. Media server 432 may include components to receive audio and video streams from the various participants—players and the dealer and distribute it to the participants. Media server 432 may communicate with game server 402—or use its components in some instances—to determine the current player, the next player, etc. (also referred to as a spin control order). The current and next player determinations may be used to select which participants' video stream are to be displayed (e.g., in current spinner video 514 and next spinner video 516 as discussed with respect to FIG. 5). Media server 432 may also distribute the dealer video to the various participants for display in dealer video 508.

Figure 5:
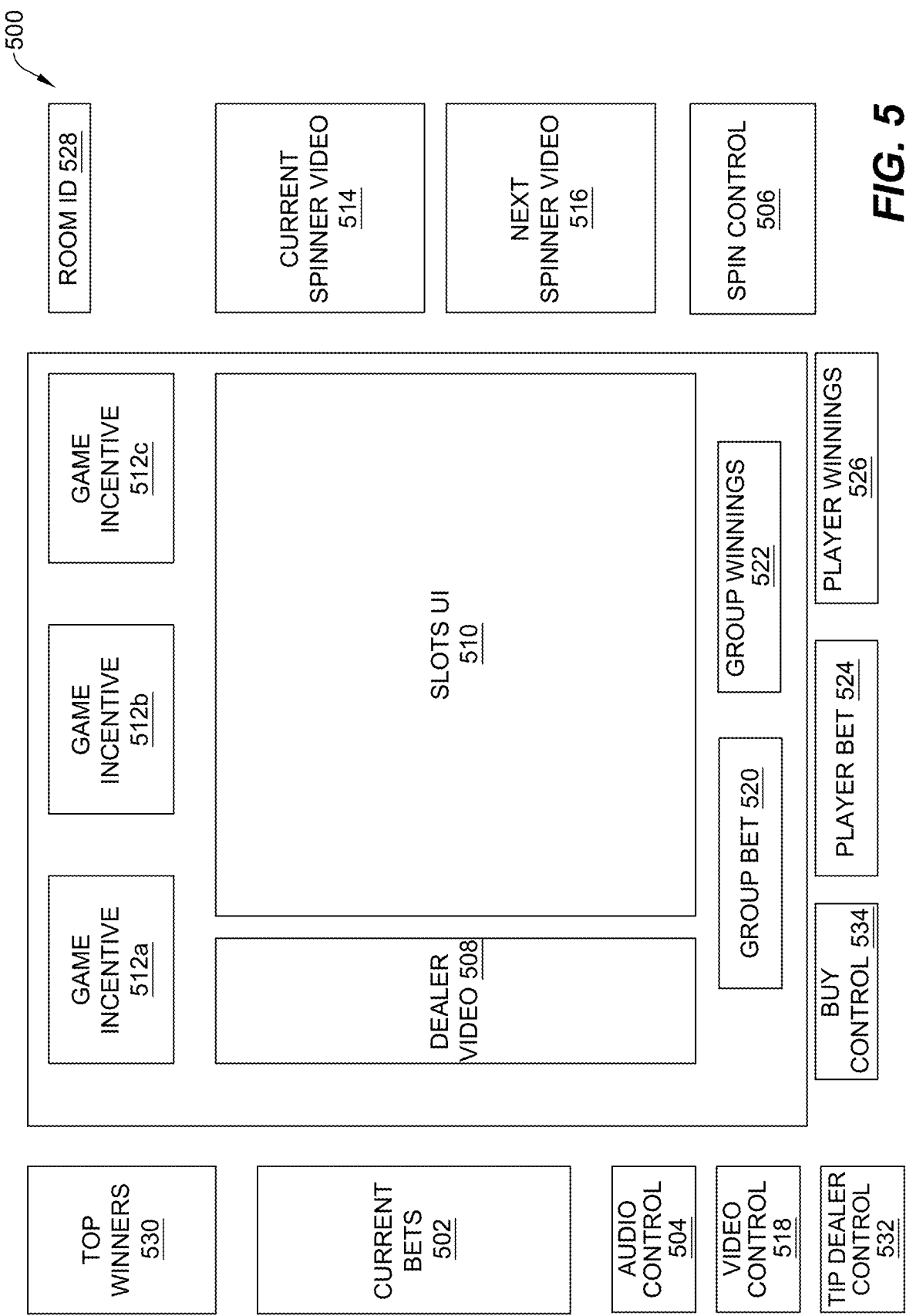
FIG. 5 illustrates a schematic of a gameplay user interface, according to various examples.

FIG. 5 illustrates a schematic of a gameplay user interface 500, according to various examples. The user interface is illustrated as including current bets 502, audio control 504, spin control 506, dealer video 508, slots UI 510, game incentive 512a, game incentive 512b, game incentive 512c, current spinner video 514, next spinner video 516, video control 518, group bet 520, group winnings 522, player bet 524, player winnings 526, room ID 528, top winners 530, tip dealer control 532, and buy control 534. The number, size, and arrangement of user interface elements is FIG. 5 are but one example, and other variants of the gameplay user interface may be used.

The gameplay user interface may be presented to a player on a display device of a computing device (e.g., user device 428) as transmitted from web server 404. In various examples, user device 428 may execute a client application that is configured to communicate with game server 402 and present gameplay user interface 500 on user device 428. The use of "presenting" in this disclosure may refer to rendering and/or transmitting content (e.g., using web client 408a) associated with gameplay user interface 500 on a computing device. In some instances, the values and graphics rendered may be based on data received from game server 402 on the computing device. Similarly, "updating" a user interface may refer to user device 428 changing one or more values, graphics, etc., on gameplay user interface 500 based on data transmitted from game server 402 to user device 428. For example, updating may include an animation of slot reels based on an outcome of a spin as determined by game server 402.

In various examples, slots UI 510 presents a slots game. A slots game is often displayed to the player in the form of various symbols arrayed in a row-by-column grid or matrix or similar arrangement of reels arranged side by side. Specific matching combinations of symbols along predetermined paths, paylines, or arrangements in the matrix indicate the outcome of the game. The display typically highlights winning combinations/outcomes for identification by the player.

The gameplay user interface in FIG. 5 may be one that is a presented to a player during a gameplay session. Other gameplay user interfaces may also be used with more or fewer user interface elements during different aspects of gameplay. For example, there may be a gameplay user interface that is used to select a room to play in, select friends to play with, select a preferred dealer, etc.

Top winners 530 may list the players that currently have the top winnings. The pool of winners from which top winners 530 selects from may be configured in a number of manners. For example, the list may be time-based (e.g., top winners in the past 24 hours), only show active players, etc. Top winners 530 may display names of all players, not just those in the room, in various examples. Current bets 502 may show the current bets of active players in the room.

Audio control 504 and video control 518 may be used by a player to configure their audio/video (AV) on their computing device. For example, audio control 504 may be used to mute a player or select a specific audio device connected to their computing device to use for audio input. Video control 518 may be used to turn on and off a player's video as well as select a specific video device connected to their computing device to use for video input. In some embodiments, player video may be turned on/off for bandwidth purposes. In some embodiments, player video may be turned off by default when they join a room and the player may turn on their video by selecting video control 518. In some embodiments, a prompt may be displayed to a player when they are about to be the spinner, the next up spinner (or their video will otherwise be displayed) in order to request the player turn their video on.

Game server 402 may receive the audio and video from each user computing device and redistribute it to the other computing devices of the other users in a room. In some instances, game server 402 may split the audio into left and right tracks. For example, the audio received from the dealer user may be configured as the left track and the audio from players configured as the right track (e.g., to recreate an in-person experience).

Not all of the video received may be retransmitted in some instances. For example, in a room with five players and one dealer, only the current spinner (current spinner video 514), next spinner (next spinner video 516), and dealer (dealer video 508) may have video displayed. By determining only a subset of received video data to re-configure and/or transmit to user computing device, bandwidth needed for the game may be reduced.

Buy control 534 may be used by a player to display a current credit amount and buy additional credits for use in gameplay. In some examples, buying does not require actual currency but virtual currency is used instead. In other examples, activation of buy control 534 may trigger a payment request to a financial account associated with the player to purchase the credits. Tip dealer control 532 may be used by a player to tip the current dealer of the room credits, in various examples. Tipping may include deducting credits from the player and distributing them to the dealer.

Player bet 524 and group bet 520 may show the current bet values for the group and individual player. A player is not limited to betting on their own turn in various examples. In various examples, additional bets may be made beyond those of the current spinner. For example, a player may bet on whether or not the current spinner may win, or bet if the current incentive will be met. Player bet 524 may be used to increase or decrease the player's bet for the current spin. Group winnings 522 and player winnings 526 may present the winnings for the group and individual player after a spin has been completed (e.g., by the current player activating spin control 506).

Game logic 414 may be used to determine the outcome of a spin and update slots UI 510 in various examples. For example, when a designated player activates a spin button (e.g., spin control 506), game logic 414 may initiate play of a spinning reel game by spinning one or more reels presented in slots UI 510. In various examples, one or more symbols on a reel are animated as spinning. In various examples, game logic 414 may receive a command indicating the activation of the spin button from the player that is the current spinner. Game logic 414 may then send commands to user device 428 associated with other players in the room to cause user device 428 to initiate the spinning reel game within their respective gameplay user interfaces.

Game logic 414 may determine the outcome of the spin. For example, game logic 414 may select stop positions for the reels based on one or more random values generated by random number generator 416 to obtain the game outcome comprising a matrix, or any other formation or arrangement, of symbols. Game logic 414 may map the outcomes of RNG 416 to reel stop positions based on game math and other consideration. In some examples, reel stop positions are communicated to user device 428 and user device 428 updates slots UI 510 to display the reels in the selected stop position. Game logic 414 may then determine whether the symbols selected to be displayed in the display matrix include one or more winning symbol combinations. For example, game logic 4140 may determine if there are any winning combinations of symbols along one of the activated paylines.

Winning symbol combinations along the activated paylines may result in the award of prize(s) by increasing the credit value of the credit meter (e.g., as shown in buy control 534) of players based on the prize(s) for such winning combination(s). Because multiple players may bet on a spin, the winnings may be distributed pro rata based on the individual bets. Consider player A bets 400 credits and player B bets 500 credits and the winnings are 1800 credits. In such a scenario, player A would receive 800 credits and player B would receive 1000 credits.

Game logic 414 may include a setting for when player control passes from one player to another. The setting may be configured in a number of ways and may be selected based on a room, a host preference, or player preference. The setting may be round-robin (e.g., predetermined spins per player or predetermined spins that reset upon a trigger such as a win), spin until you win, spin until you stop winning, among others.

Because the game is online and not in a physical location, mitigation techniques may be used when a player becomes unresponsive, and it is their turn to spin. For example, if a player in a room loses their network connection (e.g., or has an unstable network connection), a timer may be started (e.g., 1 minute) for the player to reconnect and make their spin. Another mitigation technique may be for the dealer to skip the dropped player (e.g., by selecting a UI element).

Game incentives (212a, 512b, and 512c) may display the currently active incentives available to the players. The gameplay user interface of FIG. 5 illustrates three spots for incentives, but more or fewer spots may be used. Incentives may initially be presented on the gameplay user interface for a number of reasons. For example, slot games (like many video games) are often configured according to set winning percentages. Thus, over a period of time a user may win 90% (or other amount) of the credits actually bet. When actual money is being used there may be regulatory requirements on the winning percentage (e.g., RTP). To maintain that winning percentage, an incentive itself may have a trigger rate that is commensurate with the winning percentage. In some instances, the higher the reward the lower the chance the incentive is available. Thus, incentives may be presented to the players according to their trigger rate.

In other instances—where regulatory requirements do not apply or when actual money is not being used—incentives may be triggered by the dealer directly. For example, a selection menu (not illustrated) may be presented to the dealer with stored or dynamically generated incentives. A dealer may select one of the spots (e.g., game incentive 512a) and an incentive to activate the incentive for the room.

Game logic 414 may keep track of the active incentives and update their status based on gameplay events. For example, if the incentive is based on a group bet, game logic 414 may determine if the winning condition of the incentive has been met each time a player updates their bet using player bet 524. If the incentive is a progressive incentive, the next level of the incentive may be presented to the players once the winning conditions have been met for the current level.

Room ID 528 may display the current identification (e.g., alphanumeric sequence) of the room. In various examples, rooms may persist and may be associated with certain rules, dealers, active times, players, etc. Thus, a group of friends may create a room that is private to them and have a preferred dealer that is active every Wednesday evening from 8-10 pm. Additionally, in various examples, there may be competitions between rooms. Thus, much like the top winners 530, there may be a top rooms board. As such, in various examples, credit totals may also persist across gaming sessions. In some examples, there may be tournaments in which groups or players may compete against other groups of players. In various examples, there may be qualifications needed to enter a room. For example, the qualification may be receipt of an invitation, a buy in amount, previous player activity (e.g., the length of time someone has been playing, a loyalty tier of the player, being a top winner from a previous time period), location (e.g., to ensure compliance with regulatory rules), among others.

In various embodiments, instead of a slots UI displayed on game play user interface 500, other game UIs may be displayed (e.g., a blackjack game UI, craps game UI, roulette game UI, a lottery game UI, a sports-betting UI, a daily fantasy UI, etc.).

Figure 6:
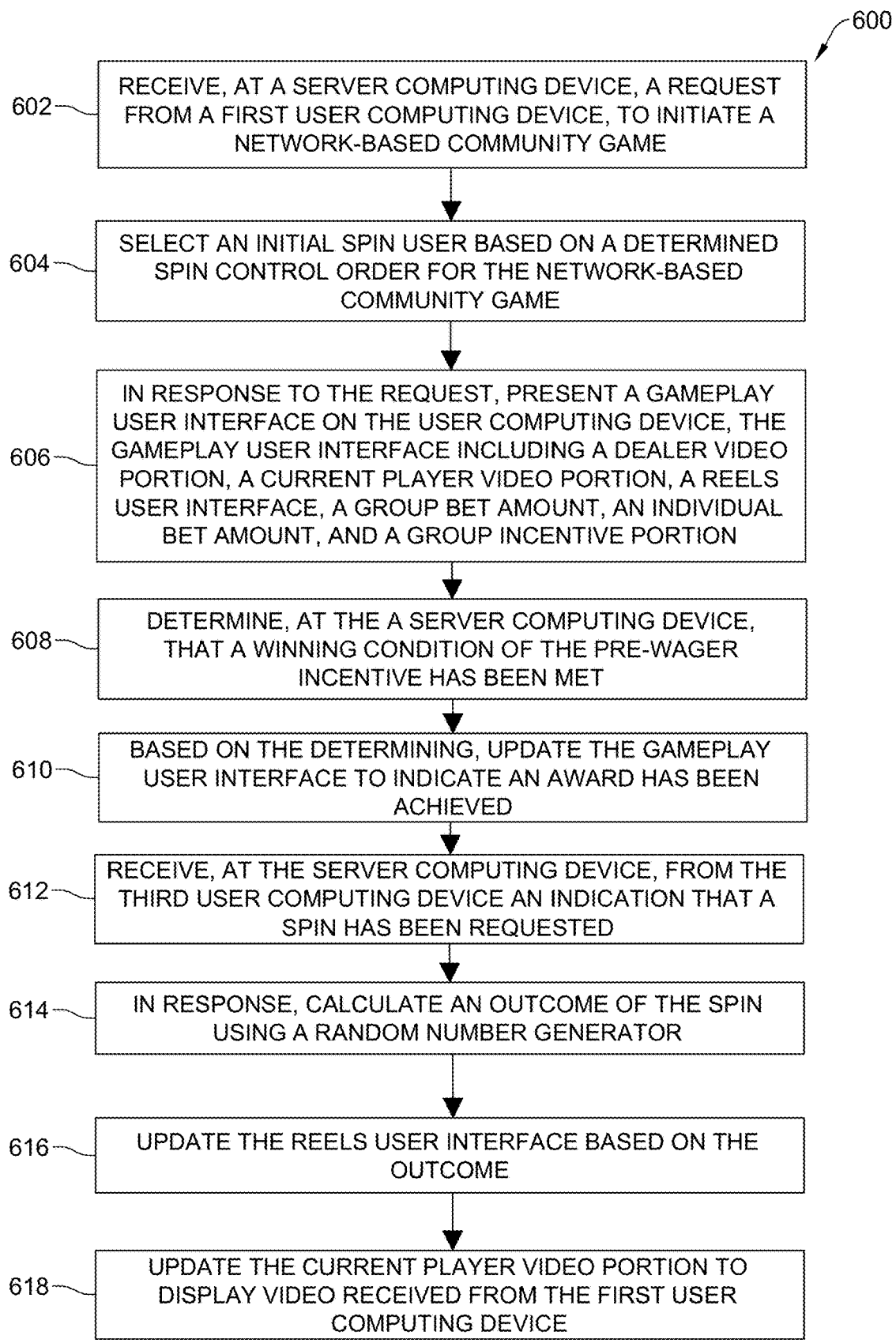
FIG. 6 illustrates a flowchart of a method to update a gameplay interface, according to various examples.

FIG. 6 is a flowchart 600 illustrating a method to update a gameplay interface, according to various examples. The method is represented as a set of blocks 602-618. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other component of the computing device(s) to carry out the set of instructions. For example, the computing device may instruct a network device to transmit data to another computing device or the computing device may provide data over a display interface to display a user interface. In some examples, performance of the method may be split across multiple computing devices using a shared computing infrastructure.

In various examples, at block 602, flowchart 600 includes receiving, at a server computing device (e.g., game server 402), a request from a first user computing device (e.g., user device 428), to initiate a network-based community game (e.g., a slots game)

In various examples, at block 604, flowchart 600 includes selecting an initial spin user based on a determined spin control order for the network-based community game. For example, game logic 414 may include the rules for the game and who is the initial spinner. In various examples, at least one player and one dealer need to be connected to a room and the player has established a balance to wager to initiate a spin. As additional players connect to the room, they may be added to a queue in the spin control order to be the player to initiate the spin.

Spin control is passed from one player to the next based on the current rule set in the room (e.g., as set by the players or dealer and/or predetermined). For example, one rule could be the current spinner continues spinning until they lose, etc. (e.g., a game outcome of zero credits or an amount of credits below a threshold is presented), as discussed herein. In various examples, players may be able to select whether they want to be eligible to spin the reels. Each player may be required to make a wager prior to the initiation of the spin. If a player does not make a wager, then they are not eligible to share in any win resulting from the spin. In various examples, players may establish a wager amount for each spin, and the wager amount may be automatically deducted from their balance without any player input to make game play go quicker. In various examples, players can select wager amounts based on the player controlling the spin.

In various examples, at block 606, flowchart 600 includes in response to the request, presenting a gameplay user interface (e.g., as depicted in FIG. 5) on the user computing device, the gameplay user interface including a dealer video portion (e.g., dealer video 508) configured to display video received from a second user computing device (e.g., dealer device 406), a current player video portion (e.g., current spinner video 514) configured to display video received from a third user computing device, a reels user interface (e.g., slots UI 510) depicting a matrix of symbols, a group bet amount (e.g., group bet 520), an individual bet amount (e.g., player bet 524), and a group incentive portion (e.g., game incentive 512a) depicting an active group incentive.

In various examples, different types of game incentives may be active for the players. Tracking the active incentives and whether their respective trigger conditions have been met may be managed by incentive tracking component 424. For example, the group incentive portion may display a pre-wager incentive. A pre-wager incentive may include trigger conditions such as a total group bet amount, a total number of players betting, or a total number of players betting above a certain amount, in various examples. There may also be outcome-based incentives with trigger conditions such as total number of symbols collected, total number of consecutive wins, etc. In some examples, the award for meeting an incentive is not immediately available. For example, the award for meeting a total wagering amount may be an additional quantity of free spins, but the free spins may not be available until at least one free spin is won based on a spin outcome. After the trigger criteria is met (which may be immediate in some examples), game outcomes may be modified to match the incentive. For example, if the incentive is an extra multiplier, then the game outcome may be modified to include the additional multiplier. In examples where the incentive is extra free spins, incentive tracking component 424 may communicate with game logic 414 to provide the extra quantity of free spins.

In various examples, at block 608, flowchart 600 includes determining (e.g., using incentive tracking component 424), at the server computing device, that a trigger condition of the active pre-wager incentive has been met.

In various examples, at block 610, flowchart 600 includes based on the determining, updating (displaying a message or animation) the gameplay user interface to indicate an award has been achieved.

In various examples, at block 612, flowchart 600 includes receiving, at the server computing device, from the third user computing device an indication that a spin has been requested.

In various examples, at block 614, flowchart 600 includes in response to the spin being requested, calculating an outcome of the spin using a random number generator (e.g., using random number generator 416 and a lookup table indicating which combination of symbols are winning combinations and their associated payouts). In various examples, the outcome is determined by game logic 414 based on the output of RNG 416. The outcome includes reel stop positions for each of the reels of the slot game. The reel stop positions may be transmitted from game server 402 to each user device (e.g., user device 428 and user device 430). A web client, or a specific application being executed on the user devices may receive the reel stop positions and initiate a spin and stop the reels based on the received reel stop positions. In various examples, game logic 414 may also determine a win amount and communicate the win amount to each user device 428, 430 for displaying on the respective devices. The win amount may include the group win amount and individual win amounts for each player, based on their specific wager amounts.

In various examples, at block 616 and block 618, flowchart 600 includes, based on the outcome, updating (e.g., show a new configuration of symbols) the reels user interface, and updating the current player video portion to display video received from the first user computing device. This may occur when play passes from one player to another and the current player video portion may reflect the new player. For example, there may be a determination that the conditions for passing control to the next player is met based on the outcome (e.g. the current player did not win). There may also be a next spinner video 516 that is updated to a new video source a determined spin control order.

In various examples, the method may also include receiving, at the server computing device, audio from the first user computing device, audio from the second user computing device, and audio from the third user computing device, combining the audio from the third user computing device and second user computing device into one channel of a stereo audio track, placing the audio from the second user computing device into another channel of the stereo audio track, and transmitting the stereo audio track to the first user computing device.

The method may also include further includes after the trigger condition has been met for the pre-wager incentive, updating the active pre-wager incentive to a new active pre-wager incentive.

The method may also include where the new active pre-wager incentive includes a trigger condition that a group bet amount is above a threshold.

The method may also include where the new active pre-wager incentive includes a trigger condition that a total number of bets is above a threshold. The method may also include where the award is a multiplier of an amount won based on the outcome.

In various examples, video of slot reels spinning and stopping is rendered by each user device (e.g., user device 428 and user device 430) and dealer device (e.g., dealer device 406) based on data received from game server 402. The devices may store program instructions that cause it to display a user interface depicted in FIG. 5, including causing the reels of slots UI 510 to spin and stop at reel positions received from game server 402. In order to sync the reel spin across various devices, time codes may be transmitted to the devices to indicate a start and end time for the reel outcomes to be displayed.

Figure 7:
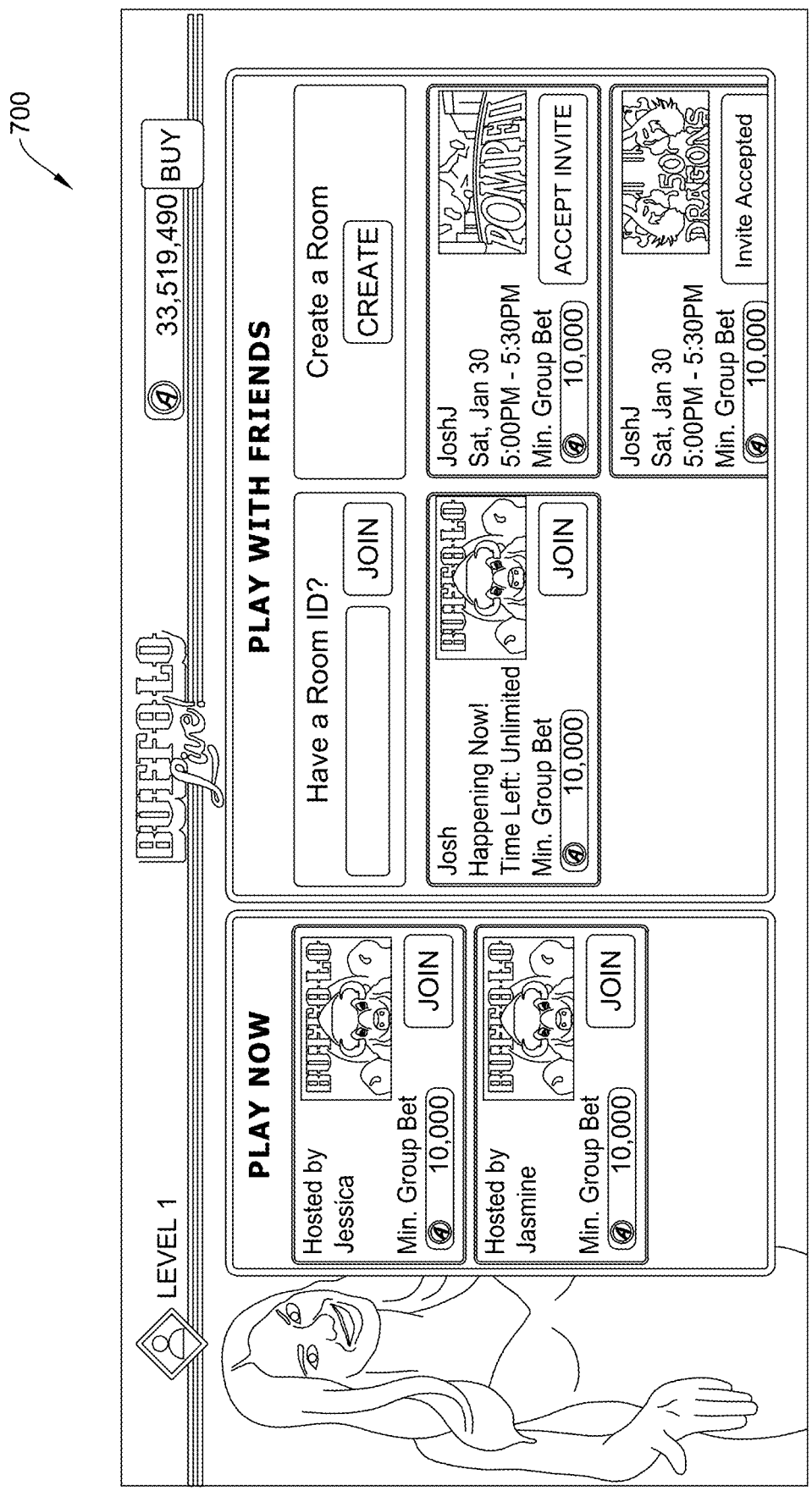
FIG. 7 is a screenshot of room selection interface, according to various examples.

FIG. 7 is a screenshot 700 of room selection interface, according to various examples. As seen, there are a number of options available to players to join an existing room or create their own room. As illustrated, different rooms have different qualifications, different lengths of time, and different games currently being played. There are also at least two types of rooms, private rooms and public rooms. Private rooms are those rooms that have been created by the player or the host and are only available to those that are invited to those rooms (e.g., an invitation may be required, a password may be required, a passcode may be required, etc.). Public rooms are rooms that have been created by the player or the host and are open to anyone to join (e.g., up to a predetermined threshold of players). When a player logs on to the system (e.g., game server 402) using their user device (e.g., user device 428), the user device may send a query to the server to obtain a list of public rooms and any private rooms that the user may have been invited to or previously joined. This information may be stored in user profiles 418. In some embodiments, players may be able search for a specific room (e.g., by entering a Room ID). Data store 426 may store a list of rooms, along with flags for public and private rooms.

Additionally, data store 426 may store a list of invited users for each of the rooms. Accordingly, this list may be queried to determine the rooms that are available to a player upon logging in.

Figure 8:
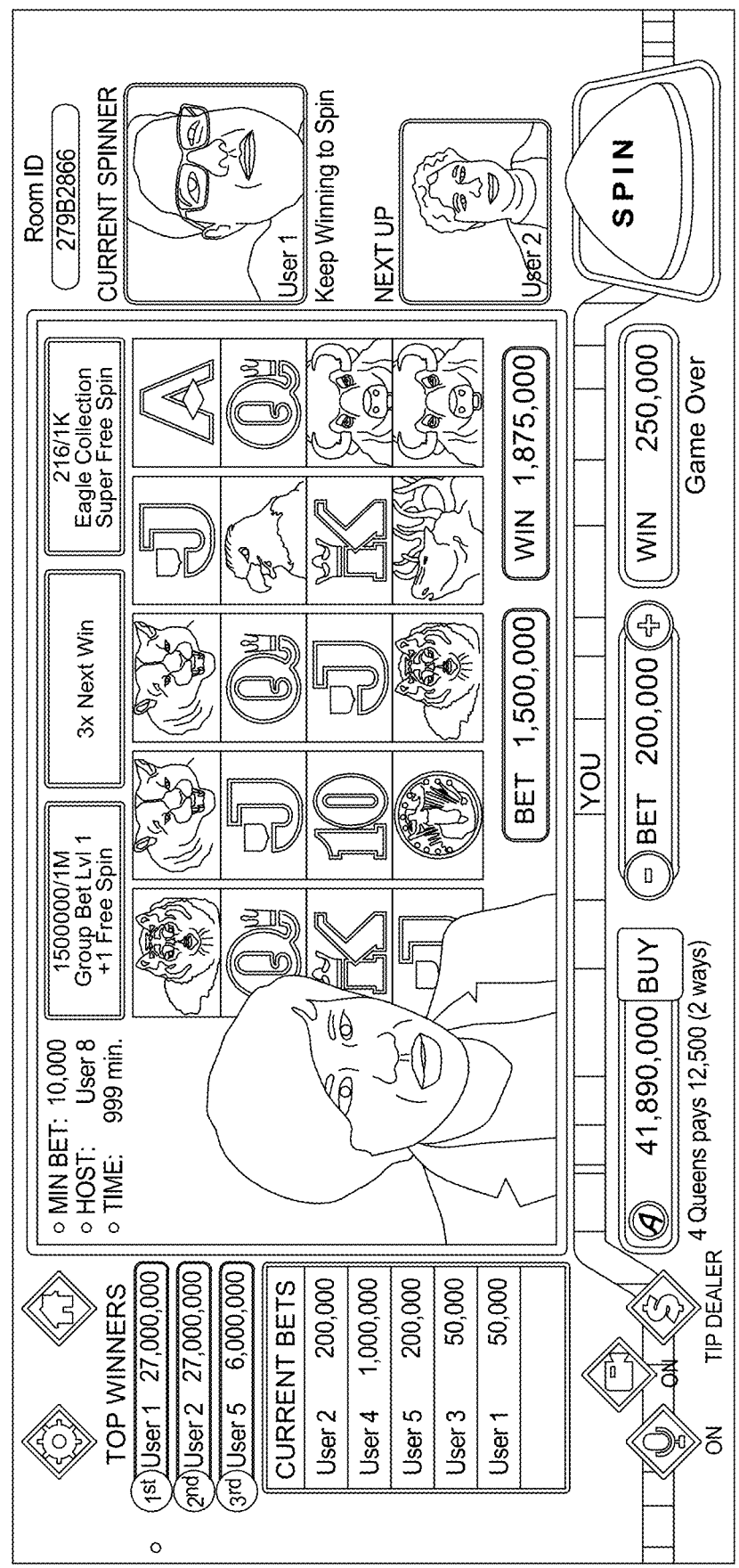
FIG. 8 is a screenshot of a gameplay user interface, according to various examples.

FIG. 8 is a screenshot 800 of a gameplay user interface, according to various examples. This gameplay user interface indicates there are three active incentives (e.g., as chosen by the host and/or randomly), with one having its trigger conditions met. There are five players betting a total of 1,500,000 credits and the incentive trigger condition is one million. However, the incentive trigger condition is not met, as the incentive requires a trigger of a free spin game. Therefore, the incentive trigger condition will be met on a play of a game where the total bet exceeds 1,000,000 and the play results in the trigger of a free spin game.

The second incentive trigger condition has been met, as three consecutive games have resulted in a win, which awards an incentive of 3× the win on the next spin. Also, the gameplay user interface shows the host video in real time directly overlaid over a portion of the symbol matrix, as configured by the game server. For example, the dealer may be "cut out" by the game server based on a color selected by the dealer (discussed in more detail with respect to FIG. 10). In some embodiments, the dealer/host may be displayed to the side instead of being overlaid on the symbol matrix. In some embodiments, hosting/dealer duties may transfer amongst players. In some embodiments, the dealer may play the game along with the players.

The gameplay user interface further indicates that User 1 is the current spinner with a next spinner (e.g., to User 2) condition being "Keep Winning to Spin," (e.g., spinner changes on a losing spin such as an outcome below a threshold number of credits). The interface further indicates that there was a 1,875,000 credit win with a displayed player receiving 13.33% of the winnings based on putting in 13.33% of the total bet (group win is 1,875,000; and individual win is 250,000).

Figure 9:
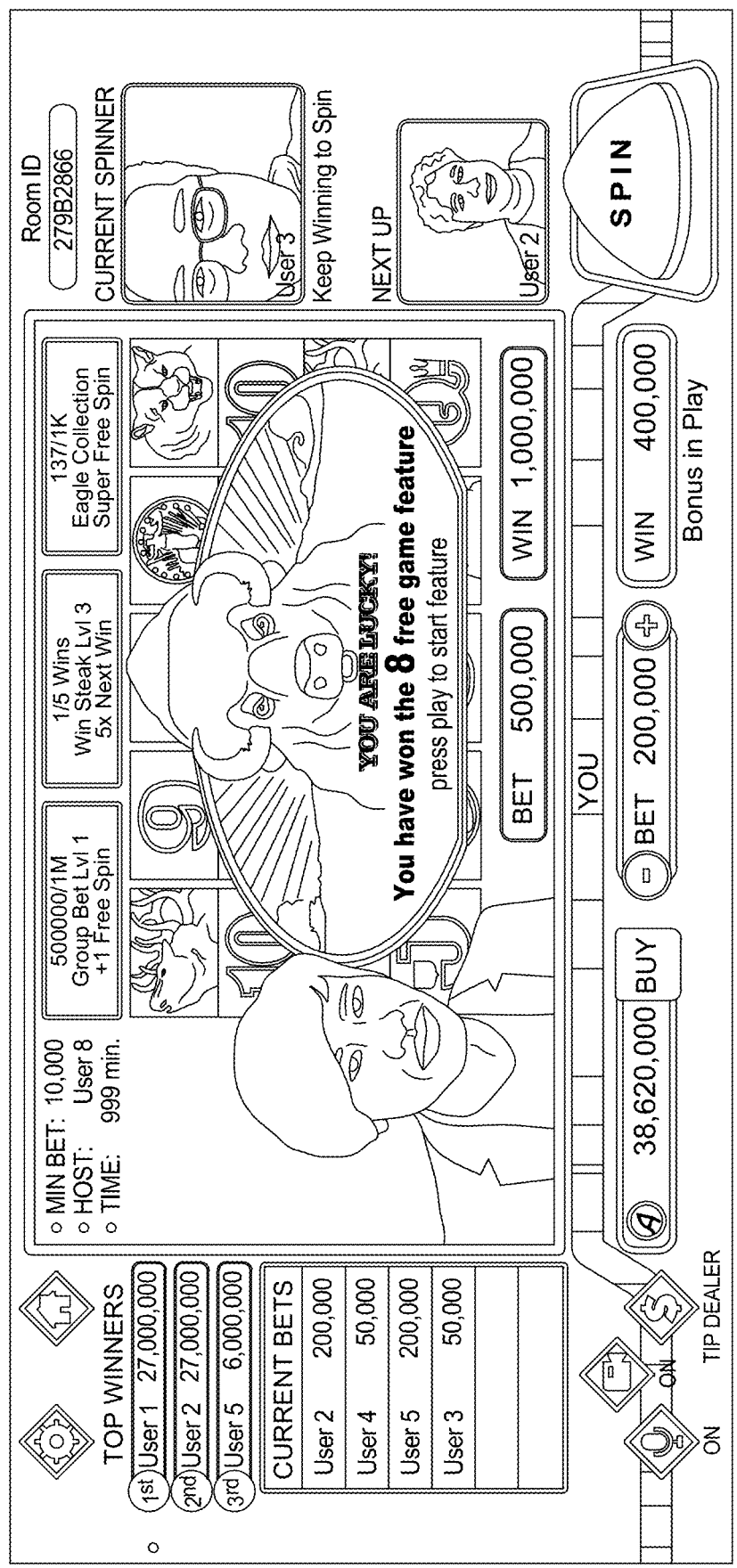
FIG. 9 is a screenshot of a gameplay user interface, according to various examples.

FIG. 9 is a screenshot 900 of a gameplay user interface, according to various examples. This gameplay user interface shows that the incentive trigger condition for one extra free spin has not been met, even though a free spin game has been triggered, because the total amount bet for that spin was lesser than the required 1,000,000 credit level (e.g., 500,000/1,000,000 was provided). In other words, to trigger one extra free spin, a free spin game would need to first be triggered (e.g., based upon a base game outcome). Accordingly, FIG. 9 illustrates that a free spin game has been triggered, but the one extra free spin will not be provided because the minimum credit level input was not achieved.

Figure 10:
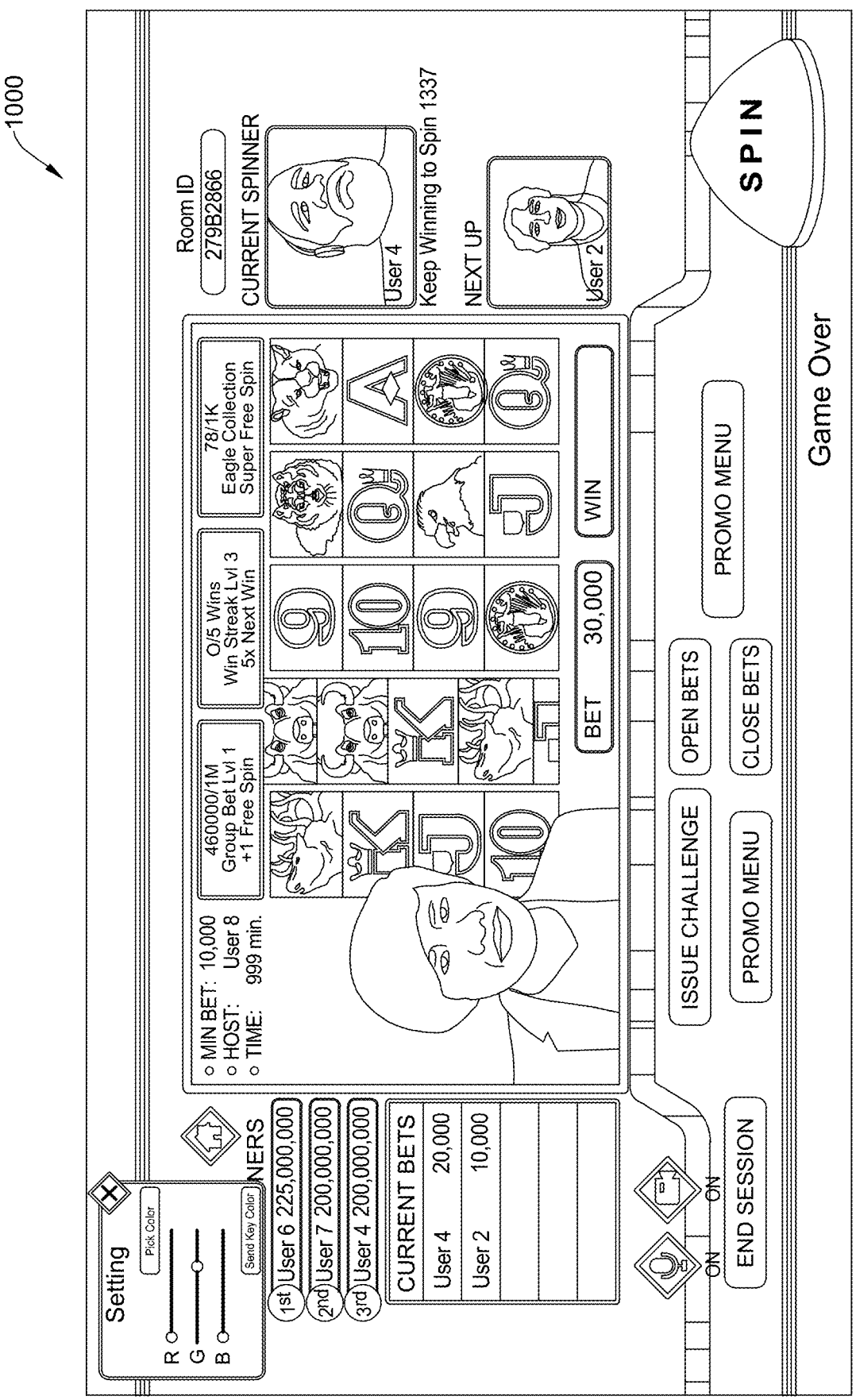
FIG. 10 is a screenshot of a dealer user interface, according to various examples.

FIG. 10 is a screenshot 1000 of a dealer user interface, according to various examples. In various examples, the dealer interface provides a plurality of settings for customization. For example, a setting may be associated with selecting a color of the background to be removed in the dealer video (e.g., green if the dealer has a green screen background, white if the dealer has a white screen/wall in the background, etc.). The dealer device (e.g., dealer device 406) transmits the color code corresponding to the region to be blocked out (green screen) so that the backend server (e.g., or each client (e.g., user device 428)) can properly remove the background from the dealer video and configure the video to be overlaid onto the slot reels screen. In various examples, the relative portion of the video of the dealer and the slot UI is set by the server (e.g., game server 402) and communicated to each client device as coordinates. This may allows for resizing of the dealer video (e.g., according to predetermined settings and/or settings set by the dealer).

In some embodiments, the dealer may be located at an EGM (e.g., the game and/or embodiments described herein may be run off of an EGM and connected to other user devices via a server), a room in a casino, or another designated room. The dealer may also be provided with other controls, as described herein.

The dealer interface in FIG. 10 also illustrates the certain options available to a dealer such as issuing challenges (e.g., incentives), opening bets, closing bets, and giving promos to users. In some embodiments, the system may make challenges available to the host to offer the players (e.g., to control RTP—certain challenges may only be available once a certain "hold" amount has been met). As illustrated, the dealer interface includes the same symbol matrix as displayed on the player devices. Thus, the dealer is able to see the same interface and quickly correct any problems that may be occurring with selecting the wrong "green screen" color.

Figure 11:
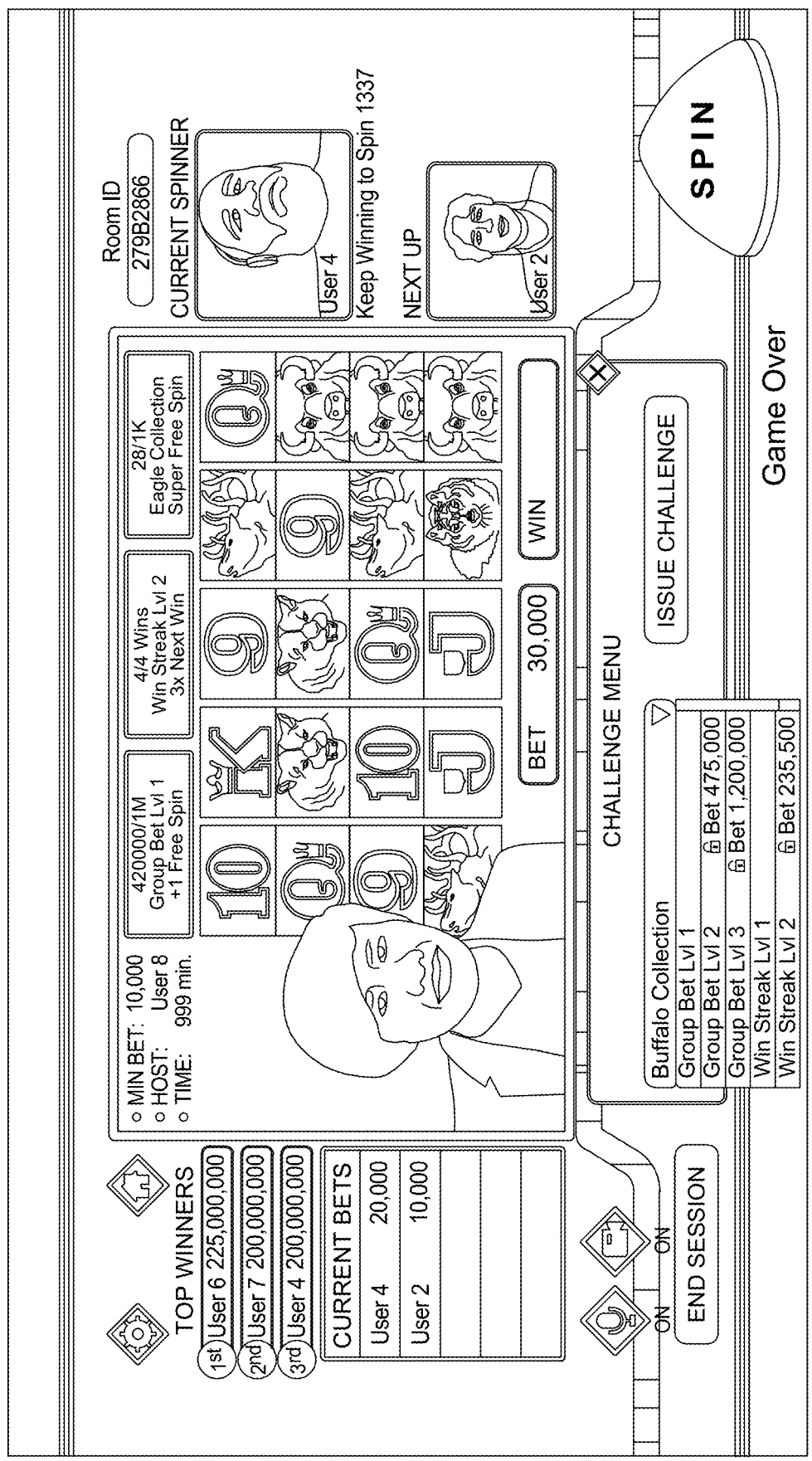
FIG. 11 is a screenshot of a dealer user interface, according to various examples.

FIG. 11 is a screenshot 1100 of a dealer user interface, according to various examples. This screenshot illustrates a more detailed view of the types of challenges that the dealer may select and the hierarchy within a class of challenges (e.g., group bets, win streaks). For example, the dealer may lock or unlock certain levels within a challenge, set the various parameters for a challenge, or selected from a predefined set of challenges. In some embodiments, challenges may be locked and/or unlocked by a backend server (e.g., according to certain bet levels being met, or other predetermined conditions being met).

Figure 12:
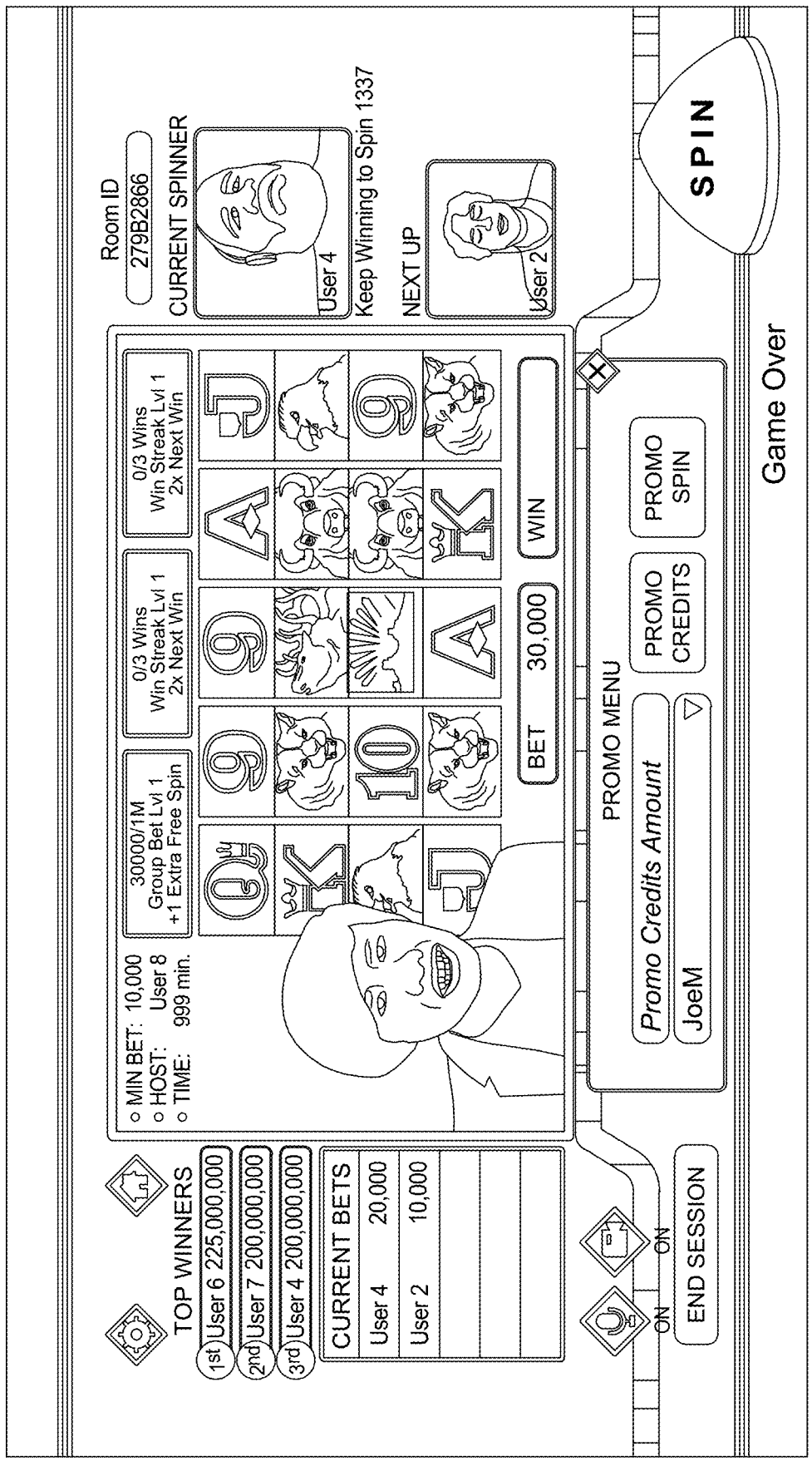
FIG. 12 is a screenshot of a dealer user interface, according to various examples.

FIG. 12 is a screenshot 1200 of a dealer user interface, according to various examples. This screenshot illustrates the option for the dealer to directly give credits or spins to one of the players in the room (e.g., as a promotion).

Accordingly, the systems and methods provided herein include various details regarding set up of a private/public room, and gameplay in the room as controlled by a host/dealer once a number of players have joined the room. In some embodiments, only one player (e.g., the host/dealer themself) may be required to be in a room before play may be started. In creating the room, the host dealer can customize the room to their preferences (e.g., choose a game type, incentives, etc.). Video and audio data of the host/dealer and players are controlled by a backend server, along with game content (e.g., game outcomes, animations, themes, etc.), to provide a seamless experience to end users with respect to the same game outcome being displayed on each user devices of the host/dealer and players, while also configuring/formatting video and audio data as described herein. Thus, players and the host/dealer are able to experience playing a community-style game virtually without needing to be present in the same location (e.g., a casino).

Figure 13:
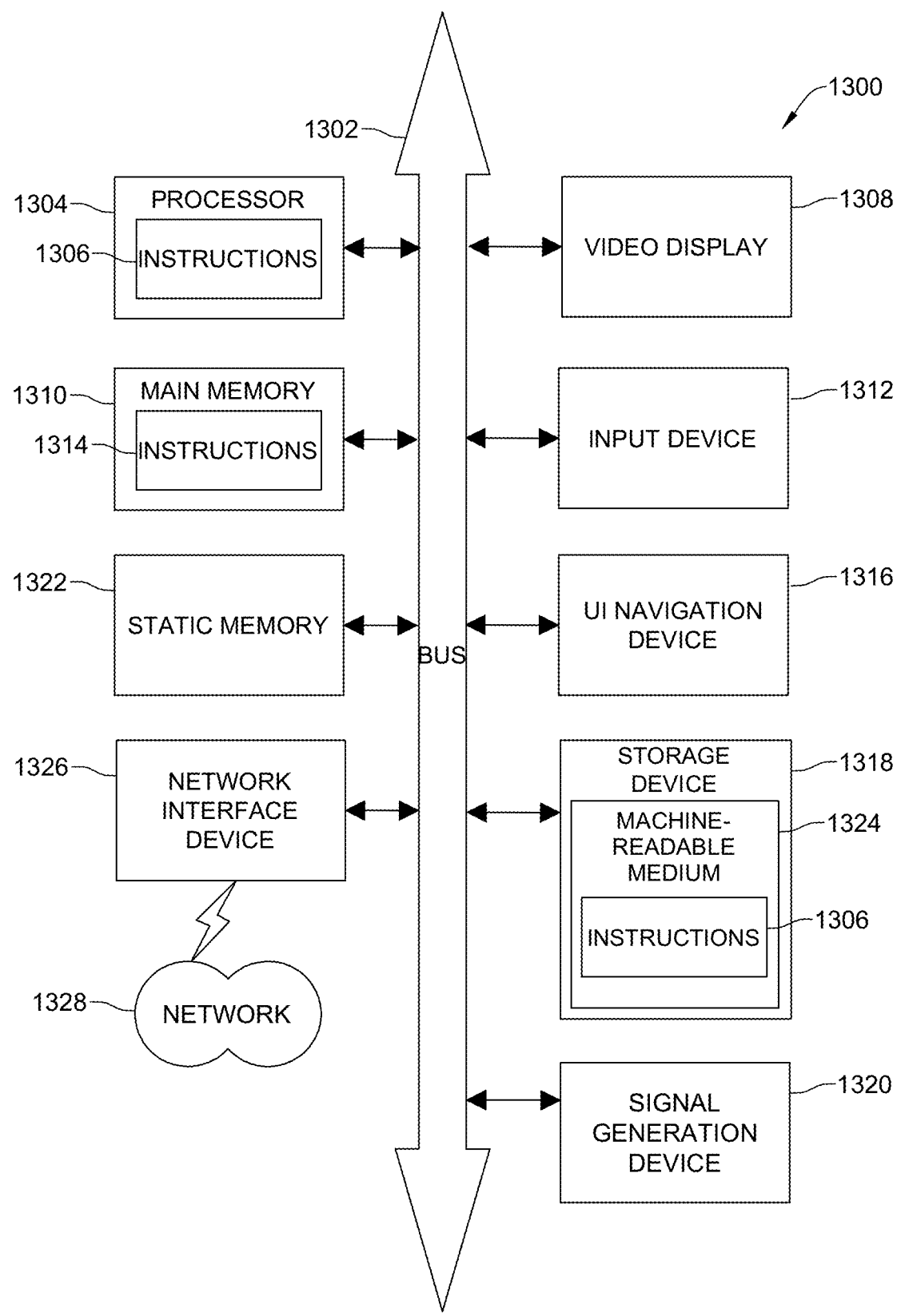
FIG. 13 is a block diagram illustrating a machine in the example form of computer system, within which a set or sequence of instructions may be executed to cause the machine to perform any one of the methodologies discussed herein, according to various examples.

FIG. 13 is a block diagram illustrating a machine in the example form of computer system 1300, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1300 includes at least one processor 1304 (e.g., a central processing unit (CPU), a graphics processing unit (GPU) or both, processor cores, compute nodes, etc.), a main memory 1310 and a static memory 1322, which communicate with each other via a bus 1302. The computer system 1300 may further include a video display 1308, an input device 1312 (e.g., a keyboard), and a user interface (UI) navigation device 1316 (e.g., a mouse). In one embodiment, the video display 1308, input device 1312, and UI navigation device 1316 are incorporated into a single device housing such as a touch screen display. The computer system 1300 may additionally include a storage device 1318 (e.g., a drive unit), a signal generation device 1320 (e.g., a speaker), a network interface device 1326, and one or more sensors (not shown), such as a global positioning system (GPS) sensor, compass, accelerometer, or other sensors.

The storage device 1318 includes a machine-readable medium 1324 on which is stored one or more sets of data structures and instructions 1314 (e.g., software) embodying or utilized by any one or more of the methodologies or functions described herein. The instructions 1314 may also reside, completely or at least partially, within the main memory 1310, static memory 1322, and/or within the processor 1304 during execution thereof by the computer system 400, with the main memory 1310, static memory 1322, and the processor 1304 also constituting machine-readable media.

While the machine-readable medium 1324 is illustrated in an example embodiment to be a single medium, the term "machine-readable medium" may include a single medium or multiple media (e.g., a centralized or distributed Database, and/or associated caches and servers) that store the one or more instructions 1314. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 1324 that excluded transitory signals.

The instructions 1314 may further be transmitted or received over a communications Network 1328 using a transmission medium via the network interface device 1326 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Figure 14:
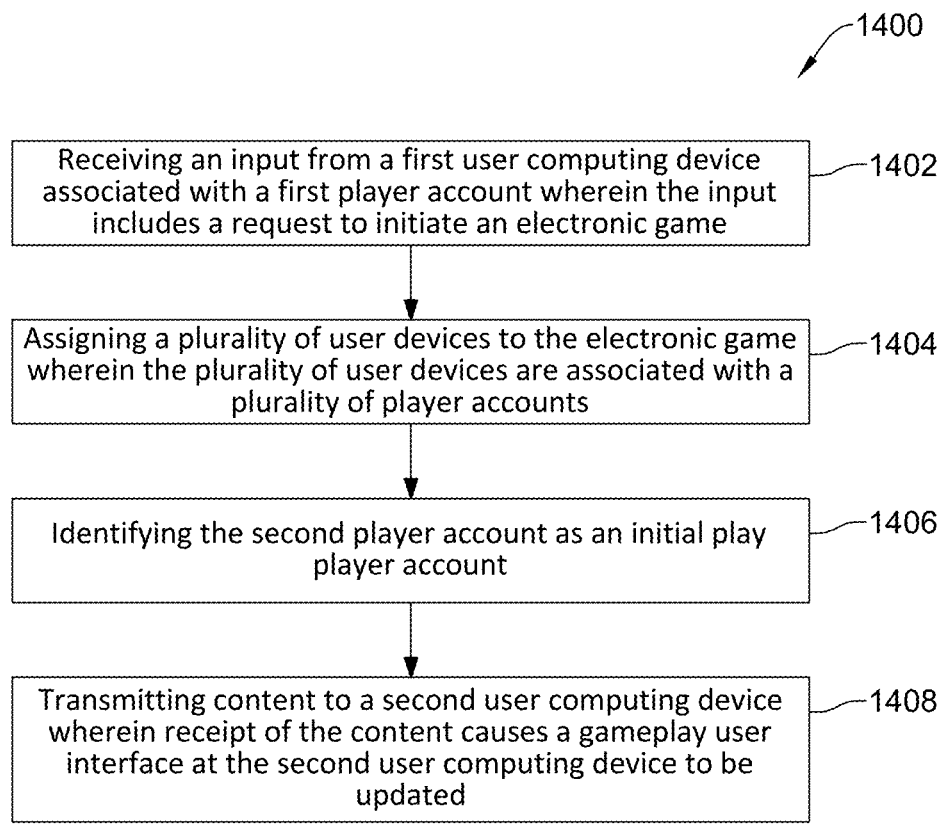
FIG. 14 illustrates an example method of network-based gameplay, as described herein.

FIG. 14 illustrates an example method 1400 of network-based gameplay, as described herein. In the example embodiment, method 1400 includes receiving 1402 an input from a first user computing device associated with a first player account wherein the input includes a request to initiate an electronic game, and assigning 1404 a plurality of user devices to the electronic game wherein the plurality of user devices are associated with a plurality of player accounts and wherein the plurality of user devices includes the first user computing device and a second user computing device associated with a second player account. In the example embodiment, method 1400 also includes identifying 1406 the second player account as an "initial play" player account, wherein the initial play player account includes a player account of the plurality of player accounts designated to initiate a first play of the electronic game. In the example embodiment, method 1400 further includes transmitting 1408 content to the second user computing device wherein receipt of the content causes a gameplay user interface at the second user computing device to be updated to include i) a first display area including video images from a video stream received from the second user computing device, the first display area indicating that the second player account is the initial play player account, and ii) a second display area including video images received from a video stream received from the first user computing device, wherein the second display area indicates that the first player account is a host for the electronic game.

In some embodiments, method 1400 includes receiving the request from the first user computing device wherein the request includes a selection that the electronic game be made private, and transmitting the content to the second user computing device in response to determining that the second player account received an invitation to play the electronic game.

In some embodiments, method 1400 includes receiving an indication that a play has been requested from the second user computing device, and based upon the play being requested and an outcome from a random number generator (RNG), determining an outcome of the electronic game. In some embodiments, method 1400 includes transmitting second content to the second user computing device, the second content indicating the outcome, determining that a condition for passing play control to a next user of the plurality of users has been satisfied, transmitting third content to the second user computing device wherein receipt of the third content causes the first display area at the second user computing device to be updated to include video images from a video stream received from a third user computing device wherein the third user computing device is associated with a third player account designated to be a subsequent play player account, receiving an indication that a next play has been requested at the third user computing device, and based upon the next play being requested and another outcome from the random number generator (RNG), determining another outcome of the electronic game. In some embodiments, method 1400 includes receiving audio data from the first user computing device, audio data from the second user computing device, and audio data from the third user computing device, combining the audio data from the third user computing device with the audio data from the second user computing device into an audio feed, and transmitting the audio feed to the first user computing device.

In some embodiments, method 1400 includes transmitting second content to the first user computing device, wherein receipt of the second content causes a plurality of incentives associated with the electronic game to be displayed on the first user computing device, receiving another input from the first user computing device, the another input including selection of at least one incentive of the plurality of incentives, and transmitting third content to the first user computing device and the second user computing device, wherein receipt of the third content by the first user computing device and the second user computing device causes the at least one incentive to be displayed on the first user computing device and the second user computing device.

Additional and/or alternative embodiments are also envisioned. Examples are explained below and supplement the above description. For instance, while certain figures illustrate example interfaces displayed in landscape orientation, interfaces may also be displayed in a portrait orientation.

In some embodiments, a user interface may include a pay table or a leave button selectable for a player to leave a room. A displayed leaderboard may be blank at the beginning of a session until players begin to accumulate wins/credits. The leaderboard may display a predetermined number of players (e.g., the top 10 players). In some embodiments, a group bet may be agreed upon by the group and applied to a game. In some embodiments, players may make individual bets in addition to the group bet. If a player designated to select "Spin" does not hit spin for a predetermined amount of time, the host may select Spin or designate a different player to select Spin. When a player exits the room/session, a confirmation screen may be displayed (e.g., including an amount they won and/or an option selectable to tip the dealer).

In some embodiments, when selecting a room, a player may select a play now option which automatically puts them in a room with other players (e.g., random players). In some embodiments, the players in a room are determined automatically based upon geographic location of the players. For example, players may be placed in a room with other player within a predetermined geographic distance from them (e.g., or the closest available players) in order to reduce "lag" and create a more efficient network connection between player devices.

In some embodiments, available rooms may be filtered by player. For example, certain rooms in a "lobby" may be displayed to players as being available to join while certain rooms are hidden (e.g., based upon connection strength, player permissions/invitations, geographic location, etc.).

To play with friends, a player may join an already created room (e.g., by entering a match ID) or may create a new room. In some embodiments, a player may receive a request to take over as host for an existing game and may accept/decline. In some embodiments, invitations received may be displayed to a player for selection to accept the invitation to a room. In some embodiments, players may have a friends list of player accounts stored in their player account.

In some embodiments, a host may select a player name (e.g., from the leaderboard or another list) and may choose for an action to be performed with respect to the player (e.g., kick/remove/ban the player from the room, award the player credits, etc.). In some embodiments, the host may control when a session ends by selecting a session end control.

A group play/syndicate betting concept where a player plays with other players is described herein (e.g., as further explained in U.S. Pat. No. 10,810,838, which is incorporated herein by reference in its entirety as explained above). Each player may control their own wager. One player at a time has the option to select spin—but each player in the group shares in the spin outcome. Player activity may be inputted from a mobile app, while game outcomes may be communicated from a backend server.

Game rules might include things like "spin until you win" or "spin until you lose" or "spin 5 times," in terms of which player has the option to select the spin button.

Each player may win proportional to their respective wager. For example, if ten players bet $10 (for a total group wager of $100) and the spin outcome/win is $200, each player gets $20 awarded back to them. In some embodiments, the game can also offer incentives to bet higher: "Bet $1,000 and jackpots double this spin" or "Bet higher this round and get more free spins," as examples. Further, any bonus feature may be provided, for example: wilds added to the reels, bonus symbols added to the reels, win is multiplied, etc. The conditions for achieving/receiving a bonus feature vary as well. For example, "Everyone bets higher than the previous spin" or "Max bet" to win the prize.

In the example embodiment, chat (e.g., text and/or audio) and video are supported. In some embodiments, players may be able to select mute (e.g., to mute one or more other players, and/or themself), stop video (e.g., to turn their video on/off), chat (e.g., to chat with other players, sound (e.g., to change volume), or rules (e.g., to display rules of the game) controls. In some embodiments, players may give permission for their camera/microphone at their device to be utilized. Further, the electronic games may include social gaming (e.g., not real money), real money gaming, or a hybrid between real money and not real money.

In some embodiments, a live dealer hosts the game. In some embodiments, each player may have their own individual game and a host may be provided for all the individual games and/or a group of the individual games. In some embodiments, a virtual dealer may be provided (e.g., an automated electronic dealer), while in some embodiments a live dealer is needed (e.g., a human). In some embodiments, the dealer may select spin on behalf of the players. Players may see a video feed of the host, the game, and/or other players. In some embodiments, the host may award virtual drinks, free credits, and/or other activities to interact with the players.

In some embodiments, the mobile app supports tournaments. In some embodiments, the host can host/provide competitions including a wheel concept. For example, a wheel with various game-based awards is spun. The first player to meet a condition associated with the outcome of the wheel (e.g., a certain number of wins, time played, wager amount, etc.) wins the prize. Players take turns spinning the reels so eventually a player will meet the condition. An example condition and award may be, "Collect twelve Jack symbols in a single spin to win $100." In some embodiments, a random challenge may be presented.

In some embodiments, awards are only eligible to be presented if the condition is met within a certain amount of time and/or a certain number of spins, as examples. For example, conditions can last for the duration of a player's turn to select the spin button. For example, if players gets five spins, the condition can be, "Win 3 spins in a row to collect $50."

In the example embodiment, players can talk to each other, but can also talk to the host. In some embodiments, a group of players can reserve a host and game for a date and/or a duration of time (e.g., 30 minutes—similar to signing up for an exercise with a particular instructor for a particular time). In some embodiments, a next available opening/available time may be displayed (e.g., in general and/or for a particular host). In some embodiments, players may change reservations (e.g., date/time/host). In some embodiments, only available hosts and/or times are displayed to the player based upon player input of a date. In some embodiments, a host may be a celebrity or other person in order to attract larger and/or specific groups of people (e.g., fans of a celebrity).

In some embodiments, the host may select a game to be played in the room from a list of games. Each player may agree to contribute money to the group pool (e.g., $200 each) and select spin a number of times each (e.g., 5). After every player has spun, the players collect whatever is left of the pool (e.g., in proportion to their respective contributions).

In the example embodiment, players may add funds to their player account any time. In some embodiments, there may be three modes of play: cooperative, competitive, and coopetive (players team up to compete against other players)

In some embodiments, a Challenge Wheel spin may determine a potential prize for a player (so the prize is not pre-determined). In some embodiments, the game theme is TV Game Show. In some embodiments, players can select avatars instead of relying solely on video to represent themselves. In some embodiments, avatars and/or other images may be utilized for certain players based upon their internet connection (e.g., a low connection below a threshold may result in the system automatically displaying an avatar instead of the video (e.g., a grainy/pixelated video because of the poor connection)). In some embodiments, players may select to apply filters to their video feeds (e.g., to put virtual masks over their faces (e.g., if they do not wish to have their face shown), different color filters, different animations of accessories (e.g., hats), similar to certain social media apps that allow users to apply filters to picture/video). The filters may be applied in real-time. A preview of a filter on player video may first be displayed to the player selecting the filter before the filter is displayed to other players. In some embodiments, filters may be applied to player video automatically based upon gameplay or other conditions being met. For example, a player info icon/badge may be displayed/overlaid with respect to the player video (e.g., a four-leaf clover being displayed for a "lucky" player who has selected spins for a predetermined number of wins, a crown being displayed for a current leader on a leaderboard, a challenger icon for a player completing the most challenges, etc.). In some embodiments, video may automatically be turned off when a player joins a room.

In some embodiments, a group of players are in the same virtual room, but may each be playing on their own slot machines and/or mobile games. Together they may compete against other rooms. In some embodiments, a leaderboard may display player total bets and total wins from a certain time period (e.g., that day) as well as largest bet and win.

In the example embodiment, since all players must bet by the same time (e.g., before selection of a spin button), there is a time when players can place bets. When the timer reaches zero, the reels spin (e.g., similar to roulette).

In some embodiments, each player does not have to place a bet for each play of the game while they are in a room. For example players may set their status from "active" to "inactive" to indicate they will not be betting (e.g., but can still interact with other players). In some embodiments, players may be removed by the host or automatically after a predetermined period of time and/or for unauthorized behavior (e.g., annoying other players).

In some embodiments, players may tip the dealer/host. In some embodiments, the host is in front of a green screen with a screen of an EGM as the background. In some embodiments, the host can interact (e.g., similar to a weatherman "drawing" on a virtual map while in front of a green screen) with the EGM background by turning symbols into other symbols (e.g., Wilds, to provide a better winning outcome to players). In other words, the host may be in front of a green screen while viewing a video of themself with the EGM background (e.g., similar to augmented reality). The host may move their hand such that it appears to be at a symbol position on the screen. Once their hand remains at that symbol position for a predetermined period of time, the symbol may be changed to an upgraded symbol (e.g., or any other symbol). For example, a camera and other technology may be leveraged to track movements of the host and cause changes to the game/EGM background based upon the tracked movements of the host (e.g., by use of one or more grids). In some embodiments, mystery symbols or pick games can be hosted by the host. As the host "touches" the symbols on the EGM background (e.g., virtually as described above), they are revealed for all the players.

In some embodiments, with so many players, the game may rely on audio conversations. In some embodiments, as players talk, a speaker icon and the players' names appear on the screen so other players can tell who is talking.

For example, a team-based mode of syndicate betting that would allow two groups of players to compete against each other may be provided. Betting may consist of contributing to a pool. Bets may be made one time and may not able to be changed once made. In themed embodiments, a competition may play out as a football game display with spins corresponding to football actions. A player from the offense spins, then the defense spins. Progression occurs based on the difference of the outcomes (e.g., corresponding to yardage in a football game—such as advancing yards or losing yards based on the offense vs defense outcomes).

In some embodiments, rooms can be modified to include a team mode. Once team mode is selected, the team mode game logic is applied. Slot games may use tournament game math to allow for a more exciting session. In some embodiments, every team mode session may be a timed event (e.g., achieve a certain number of credits, challenges, etc. in a predefined period of time (e.g., 5 minutes)). A server may keep time synced between clients.

In some embodiments, teams may be auto assigned to groups of players (e.g., which team is offense, which team is defense, in the football example above). In some embodiments, teams may be player selectable. In some embodiments, which players are on which team may be auto assigned and/or player selected. In some embodiments, no challenges may be active in team mode. In some embodiments, challenges may be active in team mode. If player leaves a session and then returns, they may be automatically assigned to the team they were previously assigned to.

While in team mode, an interface displayed to a player and/or host may also change. Continuing the football example described above, a football "skin"/pattern may be utilized as a base/background for the team mode (e.g., or another theme depending on the theme of the team game). For example, the background may be loaded to a client/user device based on a game theme of the room being entered.

Themes may also dictate which animations and/or scenes are displayed during team mode play (e.g., and/or other play). For example, football actions/animations/highlights may be displayed in the area where challenges are otherwise displayed (e.g., see 512a-512c in FIG. 5). Flourish animations may be displayed for exciting plays (e.g., a big win by the offense or defense, in the football example). In some embodiments, symbol art may change to correspond to the theme of the game (e.g., football-centric symbols in the football example). In some embodiments, after the teams are set and play of the team game has begun, players who join late may be able to enter the room and watch the game, but not participate in the game.

During team-based gameplay, teams may be automatically assigned. Teams may be generic and there may be an automatic buy-in (e.g., for 250,000—in some embodiments, if player doesn't have enough credits, the player may be given enough credits to buy in). In some embodiments, teams may be able to have different numbers of players. In some embodiments, team may have the same number of players or only be able to have a different number of players by one.

In some embodiments, length of the team game may be predetermined (e.g., an amount of time, a number of spins, etc.). For example, a team game may last 100 spins. In the football example, teams may alternate spinning (e.g., as offense and defense) and the difference between one team's offense spin the other team's defense spin determines the outcome (e.g., how much yardage was gained/lost on the play, whether one team scored (e.g., crossed into the end zone)). In some embodiments, football play action (e g, animations of plays on a field) may be limited to the "red zone" (e.g., the distance between the 20 yard line and the end zone on a football field) to keep player excitement up. In some embodiments, the team with the highest score at the end of the session will split the pot amongst the players of the winning team (e.g., proportional to the player bets, as described herein).

Continuing the football example, the team mode session may start with a virtual coin toss to decide who starts on defense and offense. Spins alternate between offense and defense. Players keep spinning until the end of the ball reaches the 1st down line, the end zone, or it's turned over. Offense spins, then defense spins, the difference between wins results in the markers in the "red zone" (e.g., animated portion of a football field) being moved. Similar to the game of football, which team is on offense and which team is on defense changes after scoring plays and/or turnovers. Play action (e.g., spin outcomes) may be determined based on a threshold table, similar to big wins. For example, play action animations may be displayed after a play or only after big plays (e.g., plays where the ball/marker advances/moves backward a threshold distance). At the end of the game (e.g., a predetermined time or number of spins), the pot (e.g., sum of player bets) is split based on what the players on the winning team bet, as described herein. After the round is over, players may then choose teams again. Players who joined in the middle of a previous round can join a team at the beginning of a new round.

Notably, while a football example is described above, different game themes are envisioned and any game theme may be utilized.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:
a server computing device comprising at least one processor in communication with at least one memory storing instructions, wherein the instructions, when executed by the at least one processor, cause the at least one processor to:
cause a host interface to be displayed at a host computing device of a plurality of computing devices associated with an electronic game, wherein at least one computing device of the plurality of computing devices is associated with a player account participating in the electronic game, and wherein the host computing device is associated with a host for the electronic game;
receive an input from the host computing device based on a selection at the host interface of a trigger condition associated with the electronic game, wherein a bonus associated with the electronic game is provided when the trigger condition is satisfied;
cause display of an indicator of the trigger condition at the at least one computing device;
determine that the trigger condition has been met in the electronic game; and
based on the trigger condition being satisfied, cause the bonus to be provided.

2. The electronic gaming system of claim 1, wherein the instructions further cause the at least one processor to cause the host interface to be displayed as including a plurality of potential trigger conditions including the trigger condition.

3. The electronic gaming system of claim 2, wherein the instructions further cause the at least one processor to:
cause a first portion of the plurality of potential trigger conditions to be displayed as being locked as unavailable for selection; and
cause a second portion of the plurality of potential trigger conditions to be displayed as being unlocked as available for selection.

4. The electronic gaming system of claim 3, wherein the instructions further cause the at least one processor to determine which of the plurality of potential trigger conditions to display as being locked and which of the plurality of potential trigger conditions to display as being unlocked based upon one or more predetermined conditions being met.

5. The electronic gaming system of claim 1, wherein the instructions further cause the at least one processor to cause the bonus to be provided by at least one of adding a number of credits to the player account or providing a number of free spins in the electronic game.

6. The electronic gaming system of claim 1, wherein the instructions further cause the at least one processor to:
track progress toward the trigger condition being met; and
cause display of the indicator to be updated as progress toward the trigger condition being met is made to communicate a current status toward the trigger condition being met.

7. The electronic gaming system of claim 1, wherein the instructions further cause the at least one processor to cause display of gameplay of the electronic game at the host computing device and the at least one computing device.

8. The electronic gaming system of claim 1, wherein the instructions further cause the at least one processor to:
receive video data from the host computing device, wherein the video data includes background data associated with a background and host image data associated with the host;
filter out the background data from the video data to produce updated video data; and
cause the host to be displayed at the at least one computing device by transmitting the updated video data to the at least one computing device.

9. The electronic gaming system of claim 8, wherein the instructions further cause the at least one processor to filter out the background data by removing at least part of the background data based on another input received from the host computing device identifying at least one background color to be removed from the video data.

10. An electronic gaming device comprising:
at least one display device;
at least one memory with instructions stored thereon; and
at least one processor in communication with the at least on display device and the at least one memory, wherein the instructions, when executed by the at least one processor, cause the at least one processor to:
display a host interface associated with an electronic game on the at least one display device;
receive an input of a selection at the host interface of a trigger condition associated with the electronic game; and
transmit first content that causes an indicator of the trigger condition to be displayed at at least one computing device associated with at least one player of the electronic game, wherein when the trigger condition is satisfied, a bonus is provided.

11. The electronic gaming device of claim 10, wherein the instructions further cause the at least one processor to display the host interface as including a plurality of potential trigger conditions including the trigger condition.

12. The electronic gaming device of claim 11, wherein the instructions further cause the at least one processor to:
display a first portion of the plurality of potential trigger conditions as being locked as unavailable for selection; and
display a second portion of the plurality of potential trigger conditions as being unlocked as available for selection.

13. The electronic gaming device of claim 12, wherein the instructions further cause the at least one processor to display the first portion of the plurality of potential trigger conditions as being locked and the second portion of the plurality of potential trigger conditions as being unlocked based upon one or more predetermined conditions being met.

14. The electronic gaming device of claim 10, wherein the instructions further cause the at least one processor to display gameplay of the electronic game on the at least one display device, wherein the gameplay is also displayed at the at least one computing device.

15. The electronic gaming device of claim 10, wherein the electronic gaming device further comprises a camera, and wherein the instructions further cause the at least one processor to:
   capture video of a host associated with the electronic gaming device, wherein the video includes a background and the host; and
   filter out the background from the video to produce an updated video data.

16. The electronic gaming device of claim 15, wherein the instructions further cause the at least one processor to filter out the background by removing at least part of the background based on another input received at the host interface identifying at least one background color to be removed from the video.

17. At least one non-transitory computer-readable storage medium with instructions stored thereon that, in response to execution by at least one processor, cause the at least one processor to:
   cause display of a host interface at a host computing device of a plurality of computing devices associated with an electronic game, wherein at least one computing device of the plurality of computing devices is associated with a player account participating in the electronic game, and wherein the host computing device is associated with a host for the electronic game;
   receive an input from the host computing device based on a selection of a trigger condition associated with the electronic game, wherein a bonus associated with the electronic game is provided when the trigger condition is achieved;
   cause display of an indicator of the trigger condition at the at least one computing device;
   identify that the trigger condition has been achieved in the electronic game; and
   in response to the trigger condition being achieved, cause the bonus to be provided.

18. The at least one non-transitory computer-readable storage medium of claim 17, wherein the instructions further cause the at least one processor to:
   cause display of a first portion of a plurality of potential trigger conditions as being locked as unavailable for selection; and
   cause display of a second portion of the plurality of potential trigger conditions as being unlocked as available for selection.

19. The at least one non-transitory computer-readable storage medium of claim 17, wherein the bonus comprises at least one of a number of credits added to the player account or a number of free spins provided in the electronic game.

20. The at least one non-transitory computer-readable storage medium of claim 17, wherein the instructions further cause the at least one processor to:
   receive video data, wherein the video data includes background data associated with a background and host image data associated with the host; and
   filter out the background data from the video data to produce updated video data.

* * * * *